US006766052B2

(12) United States Patent
Okada et al.

(10) Patent No.: US 6,766,052 B2
(45) Date of Patent: Jul. 20, 2004

(54) CHARACTER DISPLAY DEVICE, CHARACTER DISPLAY METHOD, AND RECORDING MEDIUM THEREFOR

(75) Inventors: Satoshi Okada, Kyoto (JP); Noriyuki Koyama, Kyoto (JP); Yoshimi Asai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 742 days.

(21) Appl. No.: 09/742,082

(22) Filed: Dec. 22, 2000

(65) Prior Publication Data

US 2001/0041000 A1 Nov. 15, 2001

(30) Foreign Application Priority Data

Dec. 24, 1999 (JP) .......................................... 11-368457

(51) Int. Cl.[7] .................................................. G06K 9/00

(52) U.S. Cl. ....................... 382/162; 382/274; 345/467; 345/469; 345/613; 345/589

(58) Field of Search ................................ 382/162, 229, 382/258, 274; 358/1.9; 345/589, 467, 469, 89, 613, 418, 615, 468, 469.1, 470, 471, 947, 948; 348/557, 88

(56) References Cited

U.S. PATENT DOCUMENTS 5,821,913 A 10/1998 Mamiya
6,005,635 A 12/1999 Saib et al.
6,130,667 A 10/2000 Hasegawa et al.
6,339,426 B1 * 1/2002 Lui et al. .................... 345/467
6,384,839 B1 * 5/2002 Paul ........................... 345/613

FOREIGN PATENT DOCUMENTS

EP 0 855 601 A1 7/1998
WO WO 97 08890 A 3/1997

OTHER PUBLICATIONS

Claude Betrisey et al., Displaced Filtering for Patterned Displays, SID Symposium Digest, 2000, pp. 296–299, Microsoft Corporation, WA, USA.

* cited by examiner

*Primary Examiner*—Timothy M. Johnson
*Assistant Examiner*—Ali Bayat
(74) *Attorney, Agent, or Firm*—Birch, Stewart, Kolasch & Birch, LLP

(57) ABSTRACT

A character display apparatus includes: a display device having a plurality of pixels; and a control section for controlling the display device, wherein: each of the pixels includes a plurality of sub-pixels arranged along a predetermined direction; a corresponding one of a plurality of color elements is pre-assigned to each of the sub-pixels; an intensity of each of the color elements is represented stepwise through a plurality of color element levels; the control section executes tasks of: setting each of the sub-pixels to one of the color element levels; according to a relationship between the plurality of color element levels and a plurality of brightness levels, converting the color element level for each of the sub-pixels to a corresponding brightness level among the plurality of brightness levels; and changing the relationship according to at least one of character color information which defines a color of a character to be displayed on the display device and background color information which defines a background color of the character.

9 Claims, 31 Drawing Sheets

Correction table 60

| | | Correction pattern 1 | Correction pattern 2 |
|---|---|---|---|
| Color element level | Sub-pixel 1 | 5 | 4 |
| | Sub-pixel 2 | 2 | 2 |
| | Sub-pixel 3 | 1 | 1 |

*FIG. 7*

"Yellow" (70a)

| Color element level | Brightness level R | G | B |
|---|---|---|---|
| 7 | 0 | 0 | 0 |
| 6 | 36 | 36 | 0 |
| 5 | 73 | 73 | 36 |
| 4 | 109 | 109 | 73 |
| 3 | 146 | 146 | 109 |
| 2 | 182 | 182 | 146 |
| 1 | 219 | 219 | 182 |
| 0 | 255 | 255 | 255 |

"Magenta" (70b)

| Color element level | Brightness level R | G | B |
|---|---|---|---|
| 7 | 0 | 0 | 0 |
| 6 | 36 | 0 | 36 |
| 5 | 73 | 36 | 73 |
| 4 | 109 | 73 | 109 |
| 3 | 146 | 109 | 146 |
| 2 | 182 | 146 | 182 |
| 1 | 219 | 182 | 219 |
| 0 | 255 | 255 | 255 |

"Red" (70c)

| Color element level | Brightness level R | G | B |
|---|---|---|---|
| 7 | 0 | 0 | 0 |
| 6 | 36 | 0 | 0 |
| 5 | 73 | 36 | 36 |
| 4 | 109 | 73 | 73 |
| 3 | 146 | 109 | 109 |
| 2 | 182 | 146 | 146 |
| 1 | 219 | 182 | 182 |
| 0 | 255 | 255 | 255 |

"Cyan" (70d)

| Color element level | Brightness level R | G | B |
|---|---|---|---|
| 7 | 0 | 0 | 0 |
| 6 | 0 | 36 | 36 |
| 5 | 36 | 73 | 73 |
| 4 | 73 | 109 | 109 |
| 3 | 109 | 146 | 146 |
| 2 | 146 | 182 | 182 |
| 1 | 182 | 219 | 219 |
| 0 | 255 | 255 | 255 |

"Green" (70e)

| Color element level | Brightness level R | G | B |
|---|---|---|---|
| 7 | 0 | 0 | 0 |
| 6 | 0 | 36 | 0 |
| 5 | 36 | 73 | 36 |
| 4 | 73 | 109 | 73 |
| 3 | 109 | 146 | 109 |
| 2 | 146 | 182 | 146 |
| 1 | 182 | 219 | 182 |
| 0 | 255 | 255 | 255 |

"Blue" (70f)

| Color element level | Brightness level R | G | B |
|---|---|---|---|
| 7 | 0 | 0 | 0 |
| 6 | 0 | 0 | 36 |
| 5 | 36 | 36 | 73 |
| 4 | 73 | 73 | 109 |
| 3 | 109 | 109 | 146 |
| 2 | 146 | 146 | 182 |
| 1 | 182 | 182 | 219 |
| 0 | 255 | 255 | 255 |

70

*FIG. 9*

Standard brightness table 90

| | | Brightness level | | |
|---|---|---|---|---|
| | | R | G | B |
| Color element level | 7 | 0 | 0 | 0 |
| | 6 | 36 | 36 | 36 |
| | 5 | 73 | 73 | 73 |
| | 4 | 109 | 109 | 109 |
| | 3 | 146 | 146 | 146 |
| | 2 | 182 | 182 | 182 |
| | 1 | 219 | 219 | 219 |
| | 0 | 255 | 255 | 255 |

FIG. 10

Character color setting table 100

| Character color | Shift number for color element level | | |
|---|---|---|---|
| | R | G | B |
| no color | 0 | 0 | 0 |
| yellow | 0 | 0 | +1 |
| magenta | 0 | +1 | 0 |
| red | 0 | +1 | +1 |
| cyan | +1 | 0 | 0 |
| green | +1 | 0 | +1 |
| blue | +1 | +1 | 0 |

FIG. 11

Character color setting table 110

| Character color | Shift number for color element level | | |
|---|---|---|---|
| | R | G | B |
| no color | 0 | 0 | 0 |
| yellow | −1 | −1 | 0 |
| magenta | −1 | 0 | −1 |
| red | −1 | 0 | 0 |
| cyan | 0 | −1 | −1 |
| green | 0 | −1 | 0 |
| blue | 0 | 0 | −1 |

*FIG. 12*

Color type C = "yellow"

| Color element level | Brightness level R | Brightness level G | Brightness level B |
|---|---|---|---|
| 7 | 0 | 0 | 0 |
| 6 | 36 | 36 | 0 |
| 5 | 73 | 73 | 36 |
| 4 | 109 | 109 | 73 |
| 3 | 146 | 146 | 109 |
| 2 | 182 | 182 | 146 |
| 1 | 219 | 219 | 182 |
| 0 | 255 | 255 | 255 |

*FIG. 13*

Color type C = "red"

| Color element level | Brightness level R | Brightness level G | Brightness level B |
|---|---|---|---|
| 7 | 0 | 0 | 0 |
| 6 | 73 | 36 | 36 |
| 5 | 109 | 73 | 73 |
| 4 | 146 | 109 | 109 |
| 3 | 182 | 146 | 146 |
| 2 | 219 | 182 | 182 |
| 1 | 255 | 219 | 219 |
| 0 | 255 | 255 | 255 |

*FIG. 14*

Character color setting table 140a

| Character color | Shift quantity for color brightness level | | |
|---|---|---|---|
| | R | G | B |
| no color | 0 | 0 | 0 |
| yellow | 0 | 0 | $M_1$ |
| magenta | 0 | $M_1$ | 0 |
| red | 0 | $M_2$ | $M_2$ |
| cyan | $M_1$ | 0 | 0 |
| green | $M_2$ | 0 | $M_2$ |
| blue | $M_2$ | $M_2$ | 0 |

Character color setting table 140b

| Color darkness N | Shift quantity $M_1$ | Shift quantity $M_2$ |
|---|---|---|
| 4 | −64 | −32 |
| 3 | −48 | −24 |
| 2 | −32 | −16 |
| 1 | −16 | −8 |
| 0 | 0 | 0 |

*FIG. 15*

Color type C = "yellow"
Color darkness N = "2"

| | | Brightness level | | |
|---|---|---|---|---|
| | | R | G | B |
| Color element level | 7 | 0 | 0 | 0 |
| | 6 | 36 | 36 | 4 |
| | 5 | 73 | 73 | 41 |
| | 4 | 109 | 109 | 77 |
| | 3 | 146 | 146 | 114 |
| | 2 | 182 | 182 | 150 |
| | 1 | 219 | 219 | 187 |
| | 0 | 255 | 255 | 255 |

*FIG. 16*

Color type C = "red"
Color darkness N = "2"

| | | Brightness level | | |
|---|---|---|---|---|
| | | R | G | B |
| Color element level | 7 | 0 | 0 | 0 |
| | 6 | 36 | 20 | 20 |
| | 5 | 73 | 57 | 57 |
| | 4 | 109 | 93 | 93 |
| | 3 | 146 | 130 | 130 |
| | 2 | 182 | 166 | 166 |
| | 1 | 219 | 203 | 203 |
| | 0 | 255 | 255 | 255 |

*FIG. 17*

Character color setting table 170a

| Character color | Change rate for brightness level | | |
|---|---|---|---|
| | R | G | B |
| no color | 1 | 1 | 1 |
| yellow | 1 | 1 | $K_1$ |
| magenta | 1 | $K_1$ | 1 |
| red | 1 | $K_2$ | $K_2$ |
| cyan | $K_1$ | 1 | 1 |
| green | $K_2$ | 1 | $K_2$ |
| blue | $K_2$ | $K_2$ | 1 |

Character color setting table 170b

| Color darkness N | Change rate $K_1$ | Change rate $K_2$ |
|---|---|---|
| 4 | 0.6 | 0.8 |
| 3 | 0.7 | 0.85 |
| 2 | 0.8 | 0.9 |
| 1 | 0.9 | 0.95 |
| 0 | 1.0 | 1.0 |

FIG. 18

Color type C = "yellow"
Color darkness N = "2"

| | | Brightness level | | |
|---|---|---|---|---|
| | | R | G | B |
| Color element level | 7 | 0 | 0 | 0 |
| | 6 | 36 | 36 | 29 |
| | 5 | 73 | 73 | 58 |
| | 4 | 109 | 109 | 87 |
| | 3 | 146 | 146 | 117 |
| | 2 | 182 | 182 | 146 |
| | 1 | 219 | 219 | 175 |
| | 0 | 255 | 255 | 255 |

FIG. 19

Color type C = "red"
Color darkness N = "2"

| | | Brightness level | | |
|---|---|---|---|---|
| | | R | G | B |
| Color element level | 7 | 0 | 0 | 0 |
| | 6 | 36 | 32 | 32 |
| | 5 | 73 | 66 | 66 |
| | 4 | 109 | 98 | 98 |
| | 3 | 146 | 131 | 131 |
| | 2 | 182 | 164 | 164 |
| | 1 | 219 | 197 | 197 |
| | 0 | 255 | 255 | 255 |

*FIG. 20*

Time $t=T_1$

| Character color | Shift quantity for brightness level | | |
|---|---|---|---|
| | R | G | B |
| no color | 0 | 0 | 0 |
| yellow | 0 | 0 | $M_1(T_1)$ |
| magenta | 0 | $M_1(T_1)$ | 0 |
| red | 0 | $M_2(T_1)$ | $M_2(T_1)$ |
| cyan | $M_1(T_1)$ | 0 | 0 |
| green | $M_2(T_1)$ | 0 | $M_2(T_1)$ |
| blue | $M_2(T_1)$ | $M_2(T_1)$ | 0 |

Time $t=T_2$

| Character color | Shift quantity for brightness level | | |
|---|---|---|---|
| | R | G | B |
| no color | 0 | 0 | 0 |
| yellow | 0 | 0 | $M_1(T_2)$ |
| magenta | 0 | $M_1(T_2)$ | 0 |
| red | 0 | $M_2(T_2)$ | $M_2(T_2)$ |
| cyan | $M_1(T_2)$ | 0 | 0 |
| green | $M_2(T_2)$ | 0 | $M_2(T_2)$ |
| blue | $M_2(T_2)$ | $M_2(T_2)$ | 0 |

Time $t=T_3$

| Character color | Shift quantity for brightness level | | |
|---|---|---|---|
| | R | G | B |
| no color | 0 | 0 | 0 |
| yellow | 0 | 0 | $M_1(T_3)$ |
| magenta | 0 | $M_1(T_3)$ | 0 |
| red | 0 | $M_2(T_3)$ | $M_2(T_3)$ |
| cyan | $M_1(T_3)$ | 0 | 0 |
| green | $M_2(T_3)$ | 0 | $M_2(T_3)$ |
| blue | $M_2(T_3)$ | $M_2(T_3)$ | 0 |

*FIG. 22*

Background color setting table 220

| Background color | Shift number for color element level | | |
|---|---|---|---|
| | R | G | B |
| no color | 0 | 0 | 0 |
| yellow | 0 | 0 | +1 |
| magenta | 0 | +1 | 0 |
| red | 0 | +1 | +1 |
| cyan | +1 | 0 | 0 |
| green | +1 | 0 | +1 |
| blue | +1 | +1 | 0 |

*FIG. 23*

C="no color", BC="yellow"

| | | Brightness level | | |
|---|---|---|---|---|
| | | R | G | B |
| Color element level | 7 | 0 | 0 | 0 |
| | 6 | 36 | 36 | 36 |
| | 5 | 73 | 73 | 73 |
| | 4 | 109 | 109 | 109 |
| | 3 | 146 | 146 | 146 |
| | 2 | 182 | 182 | 182 |
| | 1 | 219 | 219 | 219 |
| | 0 | 255 | 255 | 219 |

*FIG. 24*

C="cyan", BC="yellow"

| | | Brightness level | | |
|---|---|---|---|---|
| | | R | G | B |
| Color element level | 7 | 0 | 0 | 0 |
| | 6 | 0 | 36 | 36 |
| | 5 | 36 | 73 | 73 |
| | 4 | 73 | 109 | 109 |
| | 3 | 109 | 146 | 146 |
| | 2 | 146 | 182 | 182 |
| | 1 | 182 | 219 | 219 |
| | 0 | 255 | 255 | 219 |

*FIG.25*

Background color setting table 250a

| Background color | Shift quantity for brightness level | | |
|---|---|---|---|
| | R | G | B |
| no color | 0 | 0 | 0 |
| yellow | 0 | 0 | $BM_1$ |
| magenta | 0 | $BM_1$ | 0 |
| red | 0 | $BM_2$ | $BM_2$ |
| cyan | $BM_1$ | 0 | 0 |
| green | $BM_2$ | 0 | $BM_2$ |
| blue | $BM_2$ | $BM_2$ | 0 |

Background color setting table 250b

| Background color darkness BN | Shift quantity $BM_1$ | Shift quantity $BM_2$ |
|---|---|---|
| 4 | −64 | −32 |
| 3 | −48 | −24 |
| 2 | −32 | −16 |
| 1 | −16 | −8 |
| 0 | 0 | 0 |

*FIG. 26*

BC="magenta", BN="3"

| | | Brightness level | | |
|---|---|---|---|---|
| | | R | G | B |
| Color element level | 7 | 0 | 0 | 0 |
| | 6 | 36 | 36 | 36 |
| | 5 | 73 | 73 | 73 |
| | 4 | 109 | 109 | 109 |
| | 3 | 146 | 146 | 146 |
| | 2 | 182 | 182 | 182 |
| | 1 | 219 | 207 | 219 |
| | 0 | 255 | 207 | 255 |

*FIG. 27*

$(V_R, V_G, V_B) = (200,255,219)$

| | | Brightness level | | |
|---|---|---|---|---|
| | | R | G | B |
| Color element level | 7 | 0 | 0 | 0 |
| | 6 | 36 | 36 | 36 |
| | 5 | 73 | 73 | 73 |
| | 4 | 109 | 109 | 109 |
| | 3 | 146 | 146 | 146 |
| | 2 | 182 | 182 | 182 |
| | 1 | 200 | 219 | 219 |
| | 0 | 200 | 255 | 219 |

*FIG. 28*

Time $t=T_1$

| Background color | Shift quantity for brightness level | | |
|---|---|---|---|
| | R | G | B |
| no color | 0 | 0 | 0 |
| yellow | 0 | 0 | $BM_1(T_1)$ |
| magenta | 0 | $BM_1(T_1)$ | 0 |
| red | 0 | $BM_2(T_1)$ | $BM_2(T_1)$ |
| cyan | $BM_1(T_1)$ | 0 | 0 |
| green | $BM_2(T_1)$ | 0 | $BM_2(T_1)$ |
| blue | $BM_2(T_1)$ | $BM_2(T_1)$ | 0 |

Time $t=T_2$

| Background color | Shift quantity for brightness level | | |
|---|---|---|---|
| | R | G | B |
| no color | 0 | 0 | 0 |
| yellow | 0 | 0 | $BM_1(T_2)$ |
| magenta | 0 | $BM_1(T_2)$ | 0 |
| red | 0 | $BM_2(T_2)$ | $BM_2(T_2)$ |
| cyan | $BM_1(T_2)$ | 0 | 0 |
| green | $BM_2(T_2)$ | 0 | $BM_2(T_2)$ |
| blue | $BM_2(T_2)$ | $BM_2(T_2)$ | 0 |

Time $t=T_3$

| Background color | Shift quantity for brightness level | | |
|---|---|---|---|
| | R | G | B |
| no color | 0 | 0 | 0 |
| yellow | 0 | 0 | $BM_1(T_3)$ |
| magenta | 0 | $BM_1(T_3)$ | 0 |
| red | 0 | $BM_2(T_3)$ | $BM_2(T_3)$ |
| cyan | $BM_1(T_3)$ | 0 | 0 |
| green | $BM_2(T_3)$ | 0 | $BM_2(T_3)$ |
| blue | $BM_2(T_3)$ | $BM_2(T_3)$ | 0 |

*FIG. 30*

| | | Brightness level | | |
|---|---|---|---|---|
| | | R | G | B |
| Color element level | 7 | 255 | 255 | 255 |
| | 6 | 255 | 255 | 255 |
| | 5 | 219 | 219 | 219 |
| | 4 | 182 | 182 | 182 |
| | 3 | 146 | 146 | 146 |
| | 2 | 109 | 109 | 109 |
| | 1 | 72 | 72 | 72 |
| | 0 | 0 | 0 | 0 |

FIG. 32

| | | Brightness level | | |
|---|---|---|---|---|
| | | R | G | B |
| Color element level | 7 | 255 | 255 | 255 |
| | 6 | 255 | 255 | 255 |
| | 5 | 219 | 255 | 219 |
| | 4 | 182 | 219 | 182 |
| | 3 | 146 | 182 | 146 |
| | 2 | 109 | 146 | 109 |
| | 1 | 72 | 108 | 72 |
| | 0 | 0 | 0 | 0 |

CHARACTER DISPLAY DEVICE, CHARACTER DISPLAY METHOD, AND RECORDING MEDIUM THEREFOR

BACKGROUND OF THE INVENTION

1. Field of the Invention

The present invention relates to a character display apparatus and a character display method capable of displaying a character with a high definition using a color display device, and a recording medium for use with such apparatus and method.

2. Description of the Related Art

As a method for emphasizing a certain region of sentences on display, adding a color to characters, blinking characters, etc., are known.

In the conventional method for emphasizing a certain region of sentences by adding a color to characters, the characters are displayed in a single color. Such a display is conspicuous, but the color tone thereof is harsh, and therefore, the displayed characters are difficult to read. Moreover, in the conventional method for emphasizing a certain region of sentences by blinking characters, the characters vanish for a certain period of time. Thus, such a display is difficult to read, and tires an eye of a viewer.

On the other hand, the Applicant of the present application has developed techniques for displaying characters with a high definition by controlling the brightness of a color display device on a sub-pixel by sub-pixel basis. (These techniques are disclosed in Japanese Patent Application No. 11-024450, Japanese Patent Application No. 11-112954, and Japanese Patent Application No. 11-214429.) As an application of these techniques, the Applicant of the present application also developed a technique for adding a color to characters or to a background of characters.

SUMMARY OF THE INVENTION

According to one aspect of the present invention, a character display apparatus includes: a display device having a plurality of pixels; and a control section for controlling the display device, wherein: each of the pixels includes a plurality of sub-pixels arranged along a predetermined direction; a corresponding one of a plurality of color elements is pre-assigned to each of the sub-pixels; an intensity of each of the color elements is represented stepwise through a plurality of color element levels; the control section executes tasks of: setting each of the sub-pixels to one of the color element levels; according to a relationship between the plurality of color element levels and a plurality of brightness levels, converting the color element level for each of the sub-pixels to a corresponding brightness level among the plurality of brightness levels; and changing the relationship according to at least one of character color information which defines a color of a character to be displayed on the display device and background color information which defines a background color of the character.

In one embodiment of the present invention, the character color information includes information representing a color type of the character; and the control section changes the relationship according to the information representing a color type of the character.

In another embodiment of the present invention, the character color information further includes information representing a color darkness of the character; and the control section changes the relationship according to the information representing a color type of the character and the information representing a color darkness of the character.

In still another embodiment of the present invention, the character color information includes information representing a background color type of the character; and the control section changes the relationship according to the information representing a background color type of the character.

In still another embodiment of the present invention, the character color information further includes information representing a background color darkness of the character; and the control section changes the relationship according to the information representing a background color type of the character and the information representing a background color darkness of the character.

In still another embodiment of the present invention, the relationship is determined based on one or more parameters; and at least one of the one or more parameters is a function of time.

In still another embodiment of the present invention, the control section changes the relationship according to character reverse information which determines whether or not the color type of the character and the background color type of the character are replaced with each other.

According to another embodiment of the present invention, a character display method for displaying a character on a display device having a plurality of pixels, wherein: each of the pixels includes a plurality of sub-pixels arranged along a predetermined direction; a corresponding one of a plurality of color elements is pre-assigned to each of the sub-pixels; an intensity of each of the color elements is represented stepwise through a plurality of color element levels; the character display method includes steps of: setting each of the sub-pixels to one of the color element levels; according to a relationship between the plurality of color element levels and a plurality of brightness levels, converting the color element level for each of the sub-pixels to a corresponding brightness level among the plurality of brightness levels; and changing the relationship according to at least one of character color information which defines a color of a character to be displayed on the display device and background color information which defines a background color of the character.

According to still another embodiment of the present invention, a recording medium which can be read by an information display apparatus, the apparatus including a display device having a plurality of pixels and a control section for controlling the display device, wherein: each of the pixels includes a plurality of sub-pixels arranged along a predetermined direction; a corresponding one of a plurality of color elements is pre-assigned to each of the sub-pixels; an intensity of each of the color elements is represented stepwise through a plurality of color element levels; the recording medium includes a program which causes the control section to execute steps of: setting each of the sub-pixels to one of the color element levels; according to a relationship between the plurality of color element levels and a plurality of brightness levels, converting the color element level for each of the sub-pixels to a corresponding brightness level among the plurality of brightness levels; and changing the relationship according to at least one of character color information which defines a color of a character to be displayed on the display device and background color information which defines a background color of the character.

Hereinafter, functions of the present invention will be described.

According to the present invention, the relationship between the color element level of each sub-pixel and the brightness level of the sub-pixel is changed according to at least one of character color information and background color information. Therefore, characters can be displayed with a high definition by controlling the brightness of a display device on a sub-pixel by sub-pixel basis while a color is added to the characters or to a background of the characters.

Further, a color can be added to a character while a skeleton portion (i.e., core structure) of the character, which represents core lines of strokes of the character, is kept black. Therefore, the color contrast between adjacent characters can be suppressed. As a result, characters which are not harsh and which are easy to read can be displayed so that the characters do not tire an eye of the viewer.

Furthermore, a certain area of a displayed sentence can be emphasized by changing a background color of characters. Moreover, by replacing a color of a character and a background color of the character with each other, a brighter character can be displayed so that the character can be easily viewed.

Still further, by changing the relationship between the color element level of a sub-pixel and the brightness level of the sub-pixel along with the passage of time, a color of a character or a background color of a character can be changed along with the passage of time, whereby the character can be emphasized. Such an emphasizing method prevents a character from vanishing as would occur when a character is emphasized by blinking. Thus, it is possible to provide a pleasant display which is easy for a human eye to observe.

Thus, the invention described herein makes possible the advantages of (1) providing a character display device and a character display method capable of adding a color to characters or a background of characters while displaying the characters with a high definition by the control on a sub-pixel by sub-pixel basis, and a recording medium for use with such apparatus and method, and (2) providing a character display device and a character display method capable of emphatically displaying characters so that the displayed characters do not tire a human eye, and a recording medium for use with such apparatus and method.

These and other advantages of the present invention will become apparent to those skilled in the art upon reading and understanding the following detailed description with reference to the accompanying figures.

BRIEF DESCRIPTION OF THE DRAWINGS

FIG. 7 illustrates a structure of a brightness table 70.

FIG. 9 illustrates a structure of a standard brightness table 90.

FIG. 10 illustrates a structure of a character color setting table 100.

FIG. 11 illustrates a structure of a character color setting table 110.

FIG. 12 shows a brightness table obtained by changing the relationship between the color element levels and the brightness levels as defined in the standard brightness table 90 (FIG. 9) using the character color setting table 100 (FIG. 10).

FIG. 13 shows a brightness table obtained by changing the relationship between the color element levels and the brightness levels as defined in the standard brightness table 90 (FIG. 9) using the character color setting table 110 (FIG. 11).

FIG. 14 illustrates structures of character color setting tables 140*a* and 140*b*.

FIG. 15 shows a brightness table obtained by changing the relationship between the color element levels and the brightness levels as defined in the standard brightness table 90 (FIG. 9) using the character color setting tables 140*a* and 140*b* (FIG. 14).

FIG. 16 shows another brightness table obtained by changing the relationship between the color element levels and the brightness levels as defined in the standard brightness table 90 (FIG. 9) using the character color setting tables 140*a* and 140*b* (FIG. 14).

FIG. 17 illustrates structures of character color setting tables 170*a* and 170*b*.

FIG. 18 shows a brightness table obtained by changing the relationship between the color element levels and the brightness levels as defined in the standard brightness table 90 (FIG. 9) using the character color setting tables 170*a* and 170*b* (FIG. 17).

FIG. 19 shows another brightness table obtained by changing the relationship between the color element levels and the brightness levels as defined in the standard brightness table 90 (FIG. 9) using the character color setting tables 170*a* and 170*b* (FIG. 17).

FIG. 20 shows a character color setting table 200*a* for times $t=T_1$, $T_2$, and $T_3$.

FIG. 22 illustrates a structure of a background color setting table 220.

FIG. 23 shows a brightness table obtained by further changing the relationship between the color element levels and the brightness levels using the background color setting table 220 (FIG. 22) after the relationship between the color element levels and the brightness levels has been changed according to the character color information.

FIG. 24 shows another brightness table obtained by further changing the relationship between the color element levels and the brightness levels using the background color setting table 220 (FIG. 22) after the relationship between the color element levels and the brightness levels has been changed according to the character color information.

FIG. 25 illustrates structures of background color setting tables 250*a* and 250*b*.

FIG. 26 shows another brightness table obtained by further changing the relationship between the color element levels and the brightness levels using the background color setting tables 250*a* and 250*b* (FIG. 25) after the relationship between the color element levels and the brightness levels has been changed according to the character color information.

FIG. 27 is a new brightness table obtained by changing the relationship between the color element levels and the brightness levels as defined in the standard brightness table 90 (FIG. 9) according to expressions (6-1) and (6-2).

FIG. 28 shows a character color setting table 280*a* for times t=$T_1$, $T_2$, and $T_3$.

FIG. 30 is a new brightness table obtained by changing the relationship between the color element levels and the brightness levels as defined in the standard brightness table 90 (FIG. 9) based on expressions (7-1) and (7-2).

FIG. 32 is a new brightness table obtained by changing the relationship between the color element levels and the brightness levels as defined in the standard brightness table 90 (FIG. 9) based on expressions (8-1) and (8-2).

DESCRIPTION OF THE PREFERRED EMBODIMENTS

First, the character display principle of the present invention is described.

Figure 1:
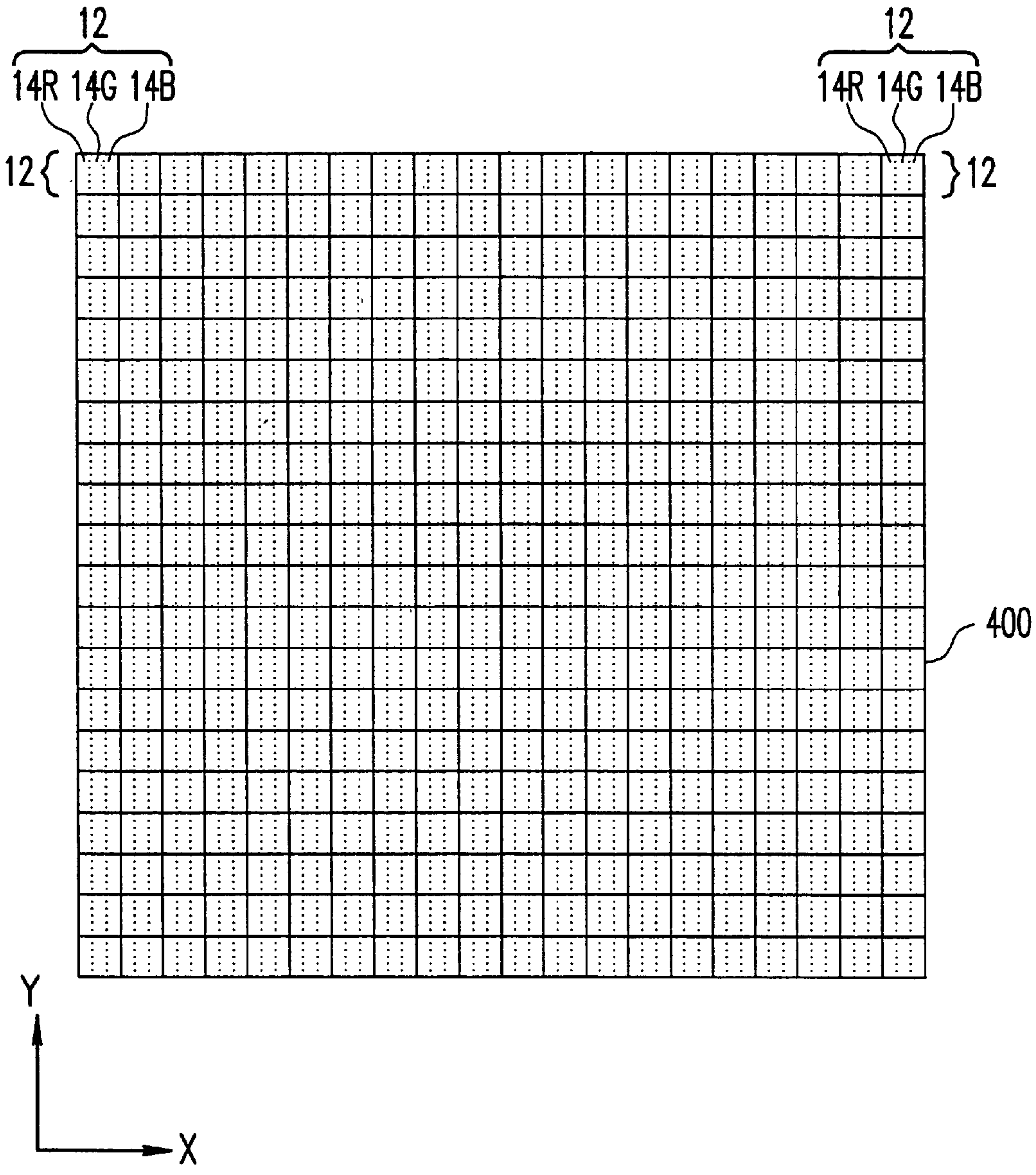
FIG. 1 schematically illustrates a display plane 400 of a display device 10 which can be used with the character display apparatus 1*a* of the present invention.

FIG. 1 schematically illustrates a display plane 400 of a display device 10 which can be used with the character display apparatus 1*a* of the present invention. The display device 10 includes a plurality of pixels 12 which are arranged along the X and Y directions. Each of the pixels 12 includes a plurality of sub-pixels which are arranged along the X direction. In the example illustrated in FIG. 1, each pixel 12 includes three sub-pixels 14R, 14G and 14B.

The sub-pixel 14R is pre-assigned to a color element R so as to output color R (red). The sub-pixel 14G is pre-assigned to a color element G so as to output color G (green). The sub-pixel 14B is pre-assigned to a color element B so as to output color B (blue). The intensity of each of the color elements R, G, and B is represented stepwise through a plurality of color element levels (e.g., color element level 0 through color element level 7).

The brightness of each of the sub-pixels 14R, 14G and 14B is represented by a value ranging from 0 to 255, for example. When each of the sub-pixels 14R, 14G and 14B may independently take a value ranging from 0 to 255, it is possible to display about 16,700,000 (=256×256×256) different colors.

When a character is displayed with a conventional dot font or gray-scale font as described above, each dot of the character is associated with one pixel of the display apparatus. On the contrary, each dot of a character to be displayed on the display device 10 is associated with one of the sub-pixels 14R, 14G and 14B included in the pixel 12. Thus, even when using a conventional display device, the resolution of the display device can be virtually increased threefold. As a result, parts of a character such as oblique lines or curves can be displayed smooth, thereby significantly improving the character display quality.

However, when simply changing the unit of character display from pixels to sub-pixels, the displayed character will not be observed by a human eye to be displayed in a single color, but rather color stripes (color noise) will be observed. This is because the sub-pixels 14R, 14G and 14B aligned along the X direction are pre-assigned to different color elements, respectively. In order to prevent the displayed character from being observed by a human eye in non-single color, the present invention appropriately controls the color element level of a sub-pixel adjacent to a sub-pixel corresponding to the skeleton portion of the character. In this way, colors other than the color of the character can be made less conspicuous to a human eye.

Thus, the present invention independently controls the color elements (R, G, B) which respectively correspond to the sub-pixels 14R, 14G and 14B included in one pixel 12, while appropriately controlling the color element level of a sub-pixel adjacent to a sub-pixel corresponding to the skeleton portion of the character. In this way, not only the outline of the character but also the character itself can be displayed in virtually a single color with a high definition. The expression "virtual single color" as used herein refers to a color which is not a single color in a chromatically strict sense but which can be observed by a human eye as a single color.

Hereinafter, embodiments of the present invention will now be described with reference to the accompanying drawings.

(Embodiment 1)

Figure 2A:
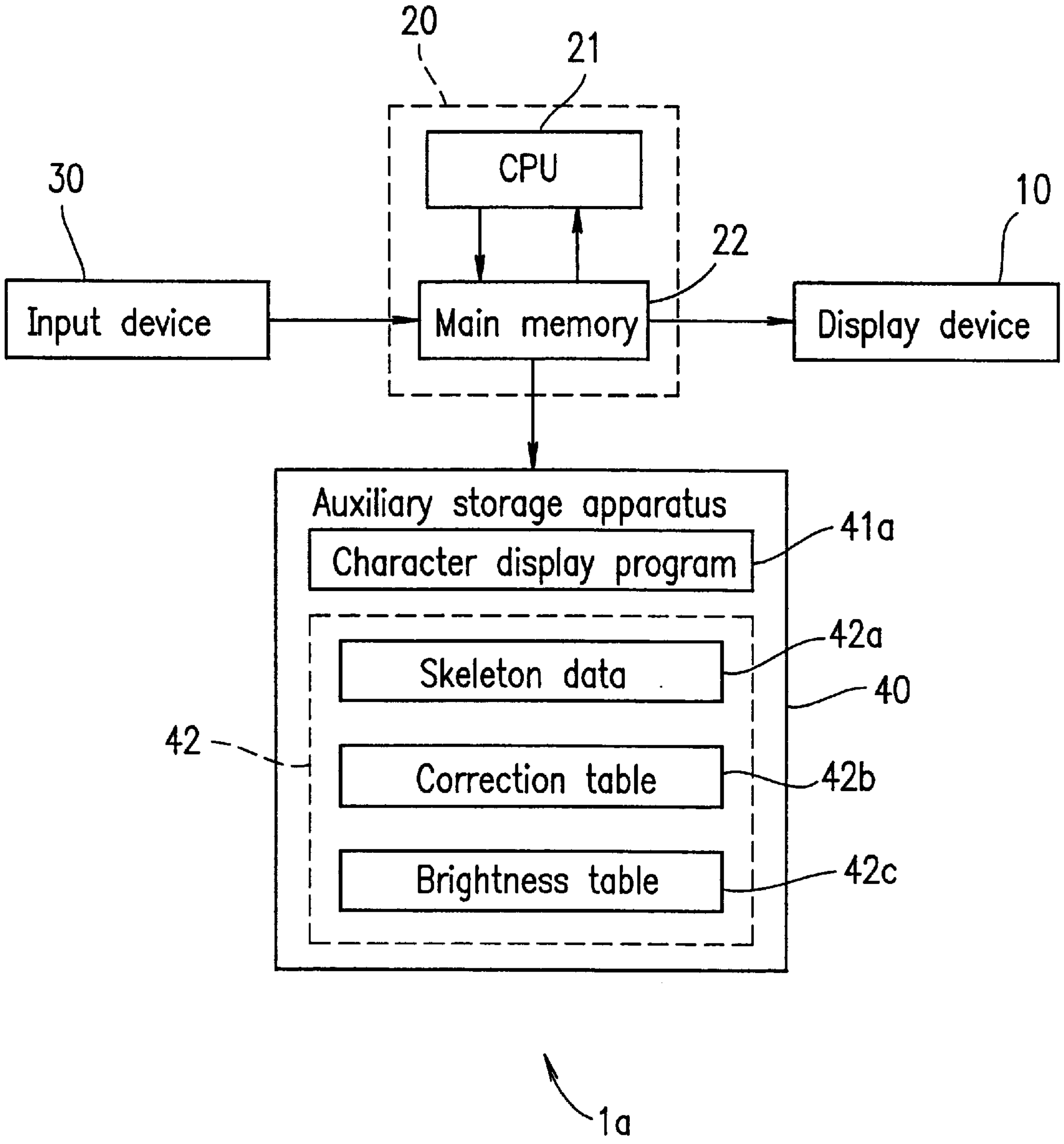
FIGS. 2A and 2B respectively illustrate structures of character display apparatuses 1*a* and 1*b* according to Embodiment 1 of the present invention.

FIG. 2A illustrates a structure of a character display apparatus 1*a* according to Embodiment 1 of the present invention.

The character display apparatus 1*a* may be, for example, a personal computer. Such a personal computer may be of any type such as a desktop type or lap top type computer. Alternatively, the character display apparatus 1*a* may be a word processor.

Moreover, the character display apparatus 1*a* may alternatively be any other electronic apparatus or information apparatus incorporating a color display device. For example, the character display apparatus 1*a* may be an electronic apparatus incorporating a color liquid crystal display device, a portable information terminal which is a portable information tool, a portable phone including a PHS, a general-purpose communication apparatus such as a telephone/FAX, or the like.

The character display apparatus 1*a* includes the display device 10 capable of performing a color display, and a control section 20 for independently controlling a plurality of color elements respectively corresponding to a plurality of sub-pixels included in the display device 10. The control section 20 is connected to the display device 10, an input device 30 and an auxiliary storage apparatus 40.

The input device 30 is used to input to the control section 20 character information representing a character to be displayed on the display device 10. For example, the character information may include a character code for identifying the character and a character size indicating the size of the character to be displayed. The input device 30 maybe any type of input device through which the character code and the character size can be input. For example, a keyboard, a mouse or a pen-type input device may suitably be used as the input device 30.

The auxiliary storage apparatus 40 stores a character display program 41*a* and data 42 which is required to execute the character display program 41*a*. The data 42 includes skeleton data 42*a* which defines the skeleton shape of a character, a correction table 42*b*, and a brightness table 42*c*. The auxiliary storage apparatus 40 may be any type of storage apparatus capable of storing the character display program 41*a* and the data 42. Any type of recording medium may be used in the auxiliary storage apparatus 40 for storing the character display program 41*a* and the data 42. For example, a hard disk, CD-ROM, MO, floppy disk, MD, DVD, IC card, optical card, or the like, may suitably be used as the auxiliary storage apparatus 40.

The present invention is not limited to applications where the character display program 41*a* and the data 42 are stored on a recording medium in the auxiliary storage apparatus 40. For example, the character display program 41*a* and the data 42 may alternatively be stored in a main memory 22 or in a ROM (not shown). For example, such a ROM may be a mask ROM, EPROM, EEPROM, flash ROM, or the like. In such a ROM-based system, it is possible to realize various types of processing only by switching a ROM to another. For example, the ROM-based system may suitably be used with a portable terminal apparatus or a portable phone.

The recording medium for storing the character display program 41*a* and the data 42 may be those which carry a program and/or data in a fixed manner such as the disk or card type storage apparatus or a semiconductor memory, as well as those which carry a program and/or data in a flexible manner such as a communication medium used for transferring a program and/or data in a communication network. When the character display apparatus 1*a* is provided with means for connecting to a communication line, including the Internet, the character display program 41*a* and the data 42 may be downloaded from the communication line. In such a case, a loader program required for the download may be either pre-stored in a ROM (not shown) or installed from the auxiliary storage apparatus 40 into the control section 20.

The control section 20 includes a CPU 21 and the main memory 22.

The CPU 21 controls and monitors the entire character display apparatus 1*a*, and also executes the character display program 41*a* stored in the auxiliary storage apparatus 40.

The main memory 22 temporarily stores data which has been input through the input device 30, data to be displayed on the display device 10, or data which is required to execute the character display program 41*a*. The main memory 22 is accessed by the CPU 21.

The CPU 21 generates a character pattern by executing the character display program 41*a* based on various data stored in the main memory 22. The generated character pattern is once stored in the main memory 22 and then output to the display device 10. The timing at which the character pattern is output to the display device 10 is controlled by the CPU 21.

Figure 3:
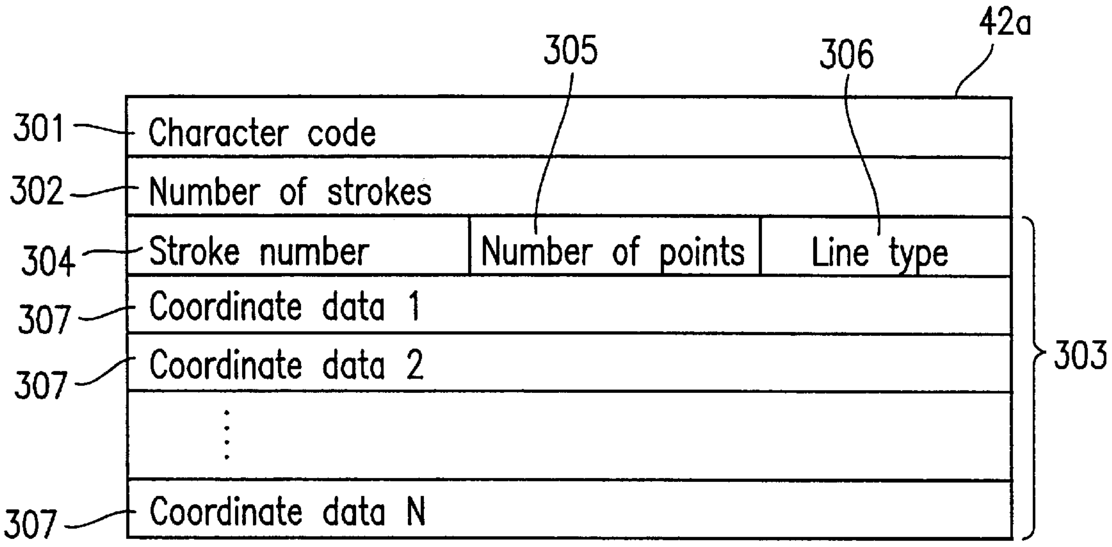
FIG. 3 illustrates a structure of skeleton data 42*a*.

FIG. 3 illustrates an exemplary structure of the skeleton data 42*a* stored in the auxiliary storage apparatus 40.

The skeleton data 42*a* represents the skeleton shape of a character. The skeleton data 42*a* includes a character code 301 for identifying the character, data 302 indicating the number M of strokes included in the character (M is an integer equal to or greater than 1), and stroke information 303 for each stroke.

The stroke information 303 for each stroke includes a stroke number 304 for identifying the stroke, data 305 indicating the number N of points included in the stroke (N is an integer equal to or greater than 1), a line type 306 indicating the line type of the stroke, and a plurality of coordinate data 307 respectively indicating the plurality of points included in the stroke. Since the number of coordinate data 307 is equal to the number of points 305, a number N of coordinate data sets are stored for each stroke.

Since the number of stroke information 303 is equal to the number of strokes 302, the skeleton data 42*a* includes a number M of stroke information 303 for stroke No. 1 to stroke No. M.

The line type 306 may include, for example, a line type "straight line" and a line type "curve". When the line type 306 is "straight line", the plurality of points included in the stroke are approximated with a straight line. When the line type 306 is "curve", the points included in the stroke are approximated with a curve (e.g., a spline curve).

Figure 4:
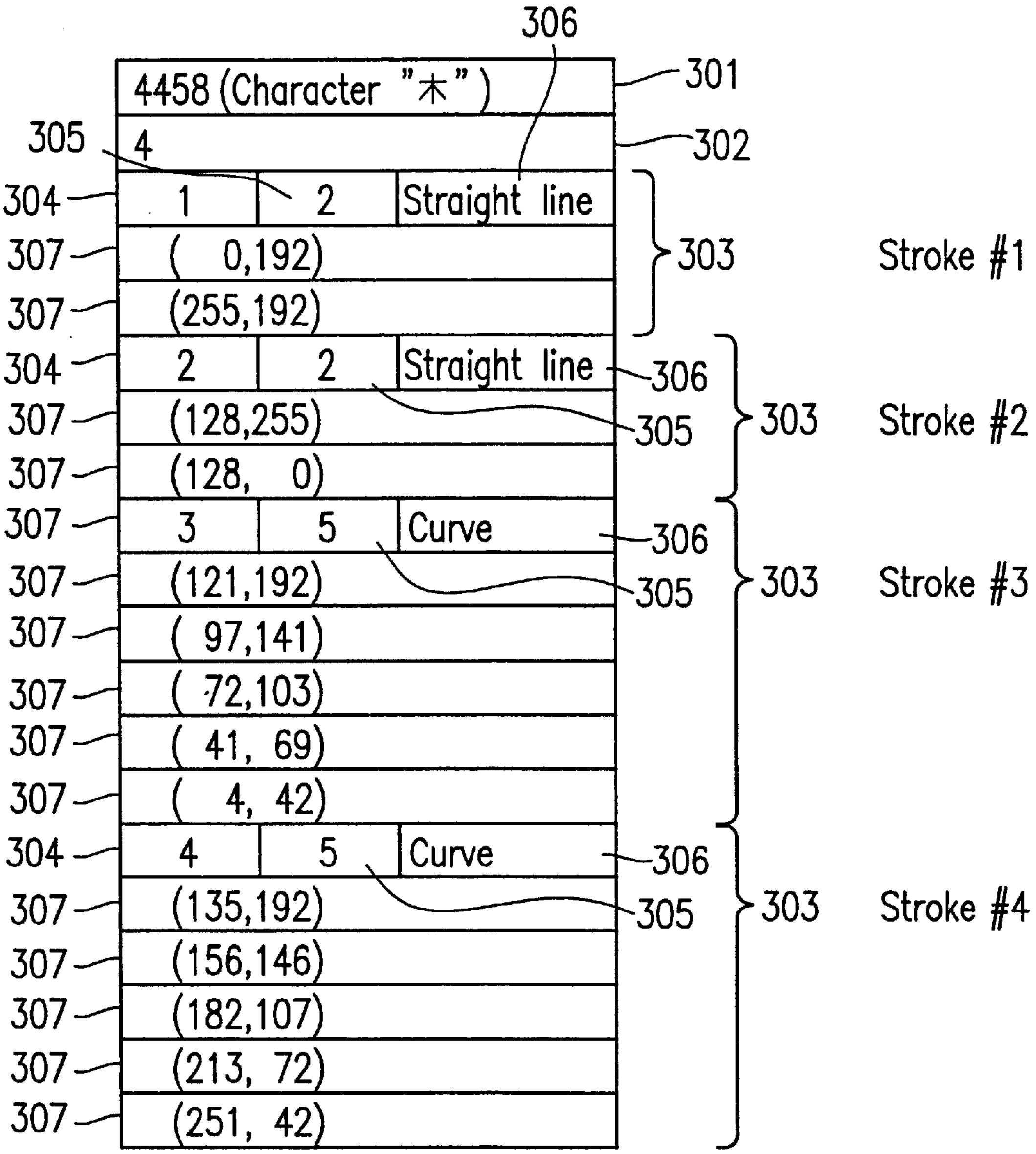
FIG. 4 illustrates an example of the skeleton data 42*a* representing the skeleton shape of a Chinese character "木".

FIG. 4 illustrates an example of the skeleton data 42*a* representing the skeleton shape of a Chinese character "木". The skeleton data 42*a* representing the skeleton shape of the Chinese character "木" includes four strokes, i.e., stroke #1 to stroke #4 respectively corresponding to stroke code 1 to stroke code 4.

Stroke #1 is defined as a straight line between a starting point (0, 192) and an end point (255, 192). Stroke #2 is defined as a straight line between a starting point (128, 255) and an end point (128, 0). Stroke #3 is obtained by approximating five points (121, 192), (97, 141), (72, 103), (41,69), (4, 42) with a curve. Stroke #4 is obtained by approximating five points (135, 192), (156, 146), (182, 107), (213, 72), (251, 42) with a curve.

Figures 5, 6:
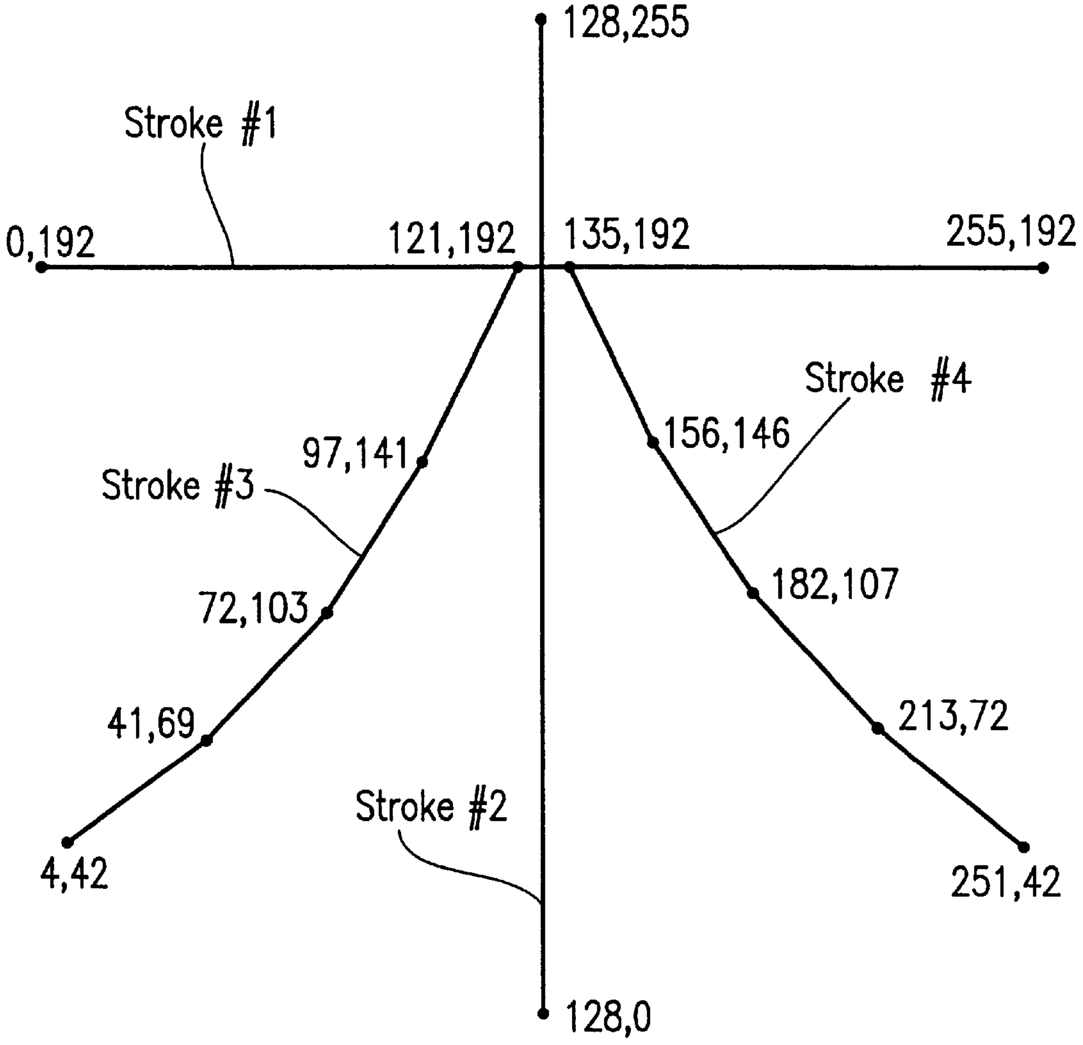
FIG. 5 illustrates an example of the skeleton data 42*a* representing the skeleton shape of the Chinese character "木" as shown on a coordinate plane.
FIG. 6 illustrates a structure of a correction table 60.

FIG. 5 illustrates an example of the skeleton data 42*a* representing the skeleton shape of the Chinese character "木" as shown on a coordinate plane. In the example illustrated in FIG. 5, stroke #3 and stroke #4 are approximated with straight lines for the sake of simplicity.

FIG. 6 illustrates a correction table 60 as an example of the correction table 42*b* stored in the auxiliary storage apparatus 40. The correction table 60 includes a correction pattern 1 and a correction pattern 2. The correction pattern 1 indicates that the color element levels of sub-pixels arranged in the vicinity of a sub-pixel corresponding to the skeleton portion of the character are set to "5", "2" and "1" in this order from the sub-pixel closest to the skeleton portion of the character to the farthest one from the skeleton portion of the character. The correction pattern 2 indicates that the color element levels of sub-pixels arranged in the vicinity of a sub-pixel corresponding to the skeleton portion of the character are set to "4", "2" and "1" in this order from the sub-pixel closest to the skeleton portion of the character to the farthest one from the skeleton portion of the character. Whether to use the correction pattern 1 or the correction pattern 2 in a particular situation will be described below with reference to FIGS. 33A, 33B, 34A and 34B.

Thus, the correction pattern 1 and the correction pattern 2 are used to determine the color element level of each sub-pixel which is arranged in the vicinity of a sub-pixel corresponding to the skeleton portion of the character.

The number of correction patterns included in the correction table 60 is not limited to 2. The number of correction patterns included in the correction table 60 may be any number equal to or greater than 2. Moreover, the number of color element levels included in each correction pattern is not limited to 3. The number of color element levels included in each correction pattern may be any number equal to or greater than 1.

FIG. 7 illustrates a brightness table 70 as an example of the brightness table 42*c* stored in the auxiliary storage apparatus 40. The brightness table 70 includes brightness tables 70*a* through 70*f*. Each of the brightness tables 70*a* through 70*f* defines the relationship between the color element level of a sub-pixel and the brightness level of the sub-pixel.

For example, in the brightness table 70*a*, a relationship between the color element levels of a sub-pixel and the brightness levels of the sub-pixel is previously established so that the color of a displayed character can be viewed by a human eye as a single color "yellow". The brightness table 70*a* is used to display a virtual single color "yellow". Similarly, the brightness tables 70*b*–70*f* are used to display virtual single colors, "magenta", "red", "cyan", "green", and "blue", respectively.

By selectively using one of the brightness tables 70*a*–70*f* based on a color of a character to be displayed, the relationship between the color element levels of a sub-pixel and the brightness levels of the sub-pixel can be set based on the color of the character to be displayed. As a result, a character of a virtual single color can be displayed on the display device 10.

In the above example, it is assumed that the color of a character is any of the six colors, "yellow", "magenta", "red", "cyan", "green", and "blue". However, the color type of a character and the number of color types are not limited thereto. The character display apparatus 1*a* can display characters of any color type and can display characters in any number of colors.

Moreover, in the case where no color is added to a character, a standard brightness table 90 (FIG. 9), which will be described later, is used. That is, in the case where "no color is added", the standard brightness table 90 is used; and in the case where "a color is added", one of the brightness tables 70*a*–70*f* is selectively used based on the color of a character to be displayed, whereby the character having an appropriate color can be displayed.

Figure 8:
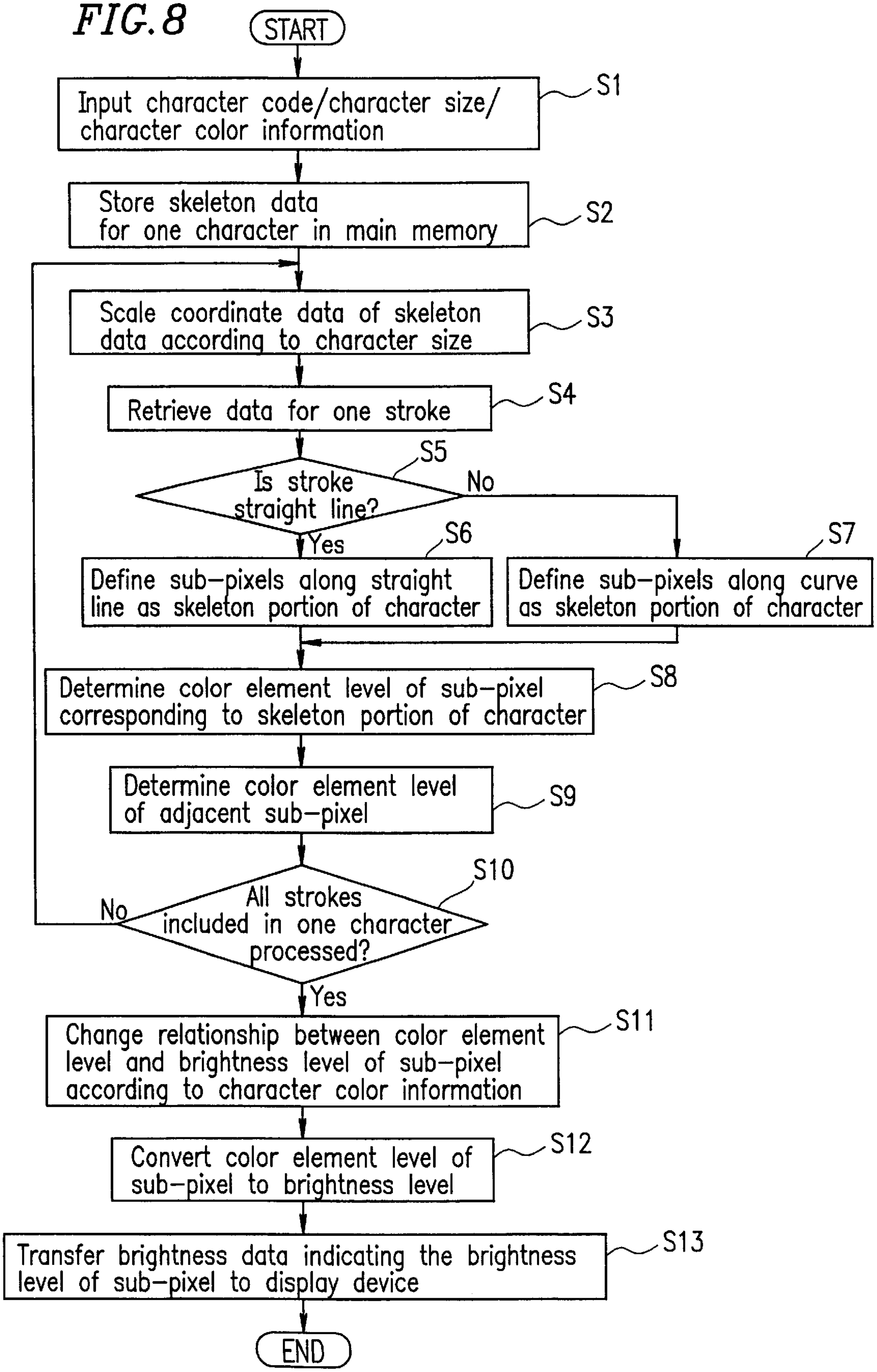
FIG. 8 illustrates a procedure for processing a character display program 41*a*.

FIG. 8 illustrates a procedure for processing the character display program 41*a*. The character display program 41*a* is executed by the CPU 21. Each step in the procedure for processing the character display program 41*a* will now be described.

Step S1: A character code, a character size, and character color information are input through the input device 30. For example, when displaying a Chinese character "木" on the display device 10, "4458" (a JIS character code; section 44, point 58) is input as the character code. The character size is represented by, for example, the number of pixels of the character to be displayed along the horizontal direction and that along the vertical direction. The character size is, for example, 20 pixels×20 pixels. The character color information defines the color of a character to be displayed on the display device 10. For example, the character color information includes information representing the color type of the character and information representing the darkness of color of the character.

Step S2: The skeleton data 42*a* for the character corresponding to the input character code is stored in the main memory 22.

Step S3: The coordinate data 307 of the skeleton data 42*a* is scaled according to the input character size. The scaling operation converts the predetermined coordinate system for the coordinate data 307 of the skeleton data 42*a* into the actual pixel coordinate system for the display device 10. The scaling operation is performed taking the sub-pixel arrangement into consideration. For example, where each pixel 12 includes three sub-pixels 14R, 14G and 14B arranged along the X direction, as illustrated in FIG. 1, if the character size is 20 pixels×20 pixels, the coordinate data 307 of the skeleton data 42*a* is scaled to data of 60 (=20×3) sub-pixels×20 sub-pixels.

Step S4: Data (stroke information 303) for each stroke is retrieved from the skeleton data 42*a*.

Step S5: It is determined whether the stroke is a straight line based on the data (stroke information 303) for the stroke which has been retrieved in step S4. Such a determination is done by referencing the line type 306 included in the stroke information 303. If the determination of step S5 is "Yes", the process proceeds to step S6. If the determination of step S5 is "No", the process proceeds to step S7.

Step S6: The points defined by the scaled coordinate data 307 are connected together with a straight line. The sub-pixels arranged along the straight line are defined as corresponding to the skeleton portion of the character. Thus, the skeleton portion of the character is defined on a sub-pixel by sub-pixel basis.

Step S7: The points defined by the scaled coordinate data 307 are approximated with a curve. The curve may be, for example, a spline curve. The sub-pixels arranged along the curve are defined as corresponding to the skeleton portion of the character. Thus, the skeleton portion of the character is defined on a sub-pixel by sub-pixel basis.

Step S8: The color element level of each sub-pixel corresponding to the skeleton portion of the character is set to the maximum color element level. For example, where the color element level of a sub-pixel is represented through eight levels, i.e., level 7 to level 0, the color element level of each sub-pixel which corresponds to the skeleton portion of the character is set to level 7.

Step S9: The color element level of each sub-pixel arranged in the vicinity of a sub-pixel corresponding to the skeleton portion of the character is set to one of level 6 to level 0 according to a predetermined correction pattern selection rule. The details of the predetermined correction pattern selection rule will be described below with reference to FIGS. 33A, 33B, 34A and 34B. For example, the setting of the color element level may be performed by using the correction table 42*b* stored in the auxiliary storage apparatus 40.

Step S10: It is determined whether steps S3–S9 have been performed for all of the strokes included in the character. If "No", the process returns to step S3. If "Yes", the process proceeds to step S11.

Step S11: The relationship between the color element level of each sub-pixel and the brightness level of the sub-pixel is changed according to the character color information.

The brightness tables 70*a*–70*f* included in the brightness table 70 each define a relationship between the color element level of a sub-pixel and the brightness level of the sub-pixel for respective character color information as shown in FIG. 7. In the case where the brightness table 70 shown in FIG. 7 is used as the brightness table 42*a*, one of the brightness tables 70*a*–70*f* included in the brightness table 70 is selectively used according to the character color information, whereby the relationship between the color element level of a sub-pixel and the brightness level of the sub-pixel can be changed according to the character color information. For example, in the case where the character color information indicates the character color "yellow", the brightness table 70*a* is selected.

Step S12: Based on the changed relationship between the color element level of each sub-pixel and the brightness level of the sub-pixel, the color element level of each sub-pixel is converted to a brightness level. For example, in the case where the color type of a character (hereinafter, referred to as "character color type") is "yellow", the color element level of the sub-pixel is converted into the brightness level according to the selected brightness table 70*a*.

In this way, by changing the relationship between the color element level of a sub-pixel and the brightness level of the sub-pixel, a character can be displayed in a virtual single color on the display device 10 according to the character color information.

Step S13: Brightness data indicating the brightness level of each sub-pixel is transferred to the display device 10. Thus, the brightness level of the display device 10 is controlled on a sub-pixel by sub-pixel basis.

Figure 2B:
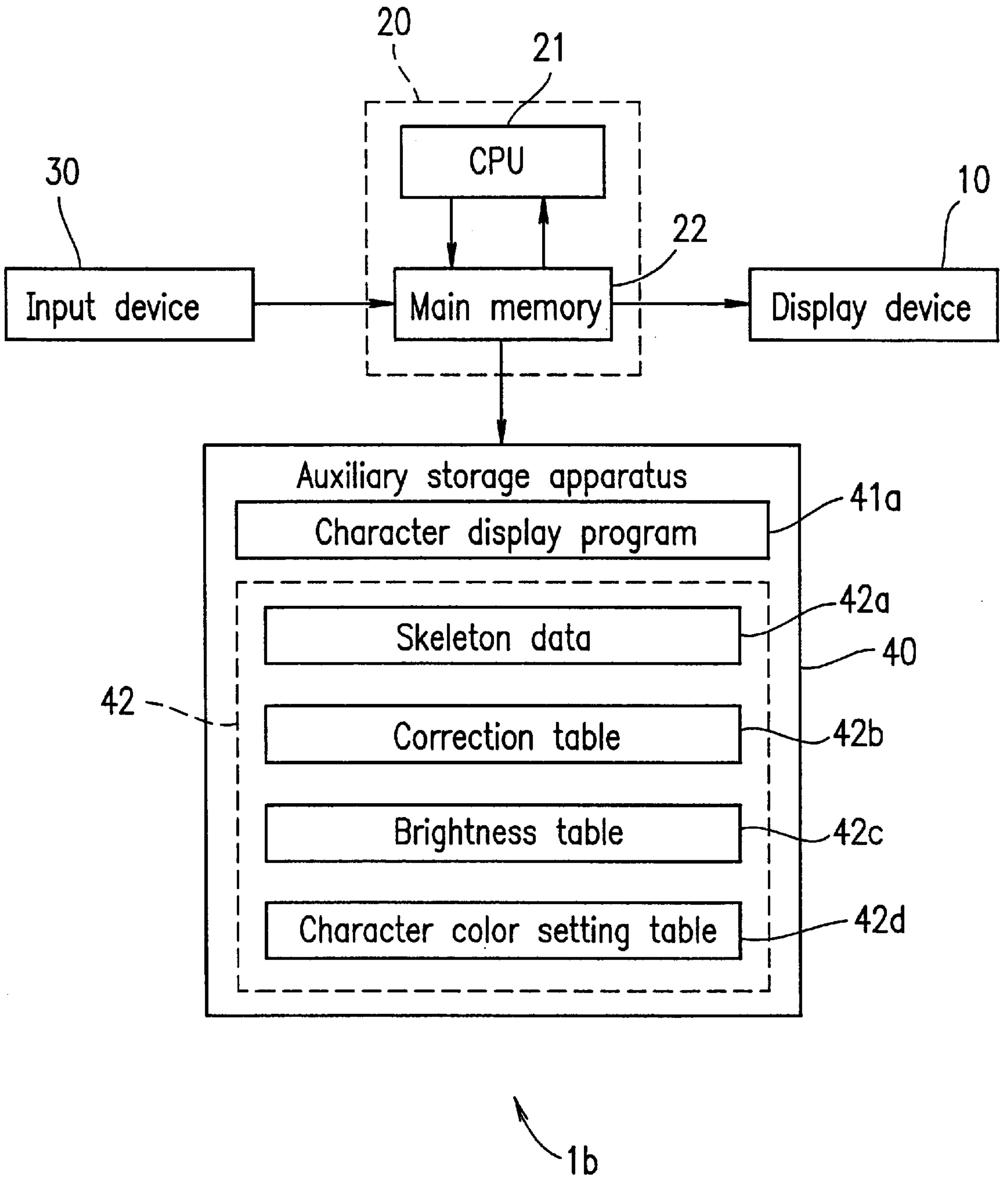

Furthermore, in addition to the brightness table 42*c,* a character color setting table 42*d* may also be stored in the auxiliary storage apparatus 40, so that the relationship between the color element level of each sub-pixel and the brightness level of the sub-pixel is changed using the brightness table 42*c* and the character color setting table 42*d.* The character color setting table 42*d* is stored as a part of the data 42 in the auxiliary storage apparatus 40. In this case, the character display apparatus results in a character display apparatus 1*b* having a structure shown in FIG. 2B.

FIG. 9 shows a standard brightness table 90 which is an example of the brightness table 42*c.*

The standard brightness table 90 defines the relationship between the color element level of each sub-pixel and the brightness level of the sub-pixel when displaying a virtual single color "black". For example, in the standard brightness table 90, color element level "6" for each of the color elements R, G, B corresponds to the brightness level "36". In the standard brightness table 90, the eight color element levels (color element level 7 through color element level 0) are assigned over the range of brightness levels of 0 to 255 at substantially regular intervals.

FIG. 10 shows a character color setting table 100 which is an example of the character color setting table 42*d.*

The character color setting table 100 defines a shift number (positive number) for a color element level which is defined in the standard brightness table 90.

In the character color setting table 100, "+1" means that color element levels for a corresponding color element defined in the standard brightness table 90 are each shifted by +1. As a result, the designated color element level, which has been set in step S9 (FIG. 8), is converted to a brightness level corresponding to a color element level which is one level greater than the designated color element level based on the standard brightness table 90. However, in the case where the shifted color element level is greater than the maximum color element level, the designated color element level is converted to a brightness level corresponding to the maximum color element level.

In the character color setting table 100, "0" means that color element levels for a corresponding color element defined in the standard brightness table 90 are not shifted. As a result, the designated color element level, which has been set in step S9 (FIG. 8), is converted to a brightness level corresponding to the designated color element level according to the standard brightness table 90.

In this way, the character color setting table 100 changes the relationship between the color element level of each sub-pixel and the brightness level of the sub-pixel which is defined in the standard brightness table 90 according to the character color information.

FIG. 11 shows another character color setting table 110 which is an example of the character color setting table 42*d.*

The character color setting table 110 defines a shift number (negative number) for a color element level which is defined in the standard brightness table 90.

In the character color setting table 110, "−1" means that color element levels for a corresponding color element defined in the standard brightness table 90 are each shifted by −1. As a result, the designated color element level, which has been set in step S9 (FIG. 8), is converted to a brightness level corresponding to a color element level which is one level smaller than the designated color element level based on the standard brightness table 90. However, in the case where the shifted color element level is smaller than the minimum color element level, the designated color element level is converted to a brightness level corresponding to the minimum color element level.

In the character color setting table 110, "0" means that color element levels for a corresponding color element defined in the standard brightness table 90 are not shifted. As a result, the designated color element level, which has been set in step S9 (FIG. 8), is converted to a brightness level corresponding to the designated color element level according to the standard brightness table 90.

In this way, the character color setting table 110 changes the relationship between the color element level of each sub-pixel and the brightness level of the sub-pixel which is defined in the standard brightness table 90 according to the character color information.

The change of the relationship between the color element level of each sub-pixel and the brightness level of the sub-pixel, which has been described with reference to FIGS. 9 through 11, is expressed by the following expressions (1-1) and (1-2):

When $L=L\max$ or $L=L\min$ (1-1)

$$D_{R(C)'}(L)=D_R(L)$$
$$D_{G(C)'}(L)=D_G(L)$$
$$D_{B(C)'}(L)=D_B(L)$$

When $L\min<L<L\max$ (1-2)

$$D_{R(C)'}(L)=\begin{cases}D_R(L\max) & L\max<L+S_R(C)\\ D_R(L+S_R(C)) & L\min\leqq L+S_R(C)\leqq L\max\\ D_R(L\min) & L+S_R(C)<L\min\end{cases}$$

$$D_{G(C)'}(L)=\begin{cases}D_G(L\max) & L\max<L+S_G(C)\\ D_G(L+S_G(C)) & L\min\leqq L+S_G(C)\leqq L\max\\ D_G(L\min) & L+S_G(C)<L\min\end{cases}$$

$$D_{B(C)'}(L)=\begin{cases}D_B(L\max) & L\max<L+S_B(C)\\ D_B(L+S_B(C)) & L\min\leqq L+S_B(C)\leqq L\max\\ D_B(L\min) & L+S_B(C)<L\min\end{cases}$$

In these expressions, L denotes a color element level, $L_{max}$ denotes the maximum value of a color element level, and $L_{min}$ denotes the minimum value of a color element level. In an example shown in FIGS. 9 through 11, L=0, 1, . . . , 7, $L_{max}$=7, and $L_{min}$=0.

C denotes a color type of the character. In an example shown in FIGS. 10 and 11, C is any one of "no color", "yellow", "magenta", "red", "cyan", "green", and "blue".

$D_R$(L) is a not-yet-changed brightness level of a sub-pixel 14R (FIG. 1) corresponding to the color element level L, $D_G$(L) is a not-yet-changed brightness level of a sub-pixel 14G (FIG. 1) corresponding to the color element level L, and $D_B$(L) is a not-yet-changed brightness level of a sub-pixel 14B (FIG. 1) corresponding to the color element level L.

$D_{R(C)}$'(L) is a changed brightness level of the sub-pixel 14R corresponding to the character color type C and the color element level L, $D_{G(C)}'(L)$ is a changed brightness level of the sub-pixel 14G corresponding to the character color type C and the color element level L, and $D_{B(C)}'(L)$ is a changed brightness level of the sub-pixel 14B corresponding to the character color type C and the color element level L.

$S_R(C)$ denotes a shift number for the color element level of the sub-pixel 14R which corresponds to the character color type C, $S_G(C)$ denotes a shift number for the color element level of the sub-pixel 14G which corresponds to the character color type C, and $S_B(C)$ denotes a shift number for the color element level of the sub-pixel 14B which corresponds to the character color type C.

Assuming a case where "yellow" is designated as the character color type C; FIG. 12 shows a brightness table obtained by changing the relationship between the color element levels and the brightness levels as defined in the standard brightness table 90 (FIG. 9) using the character color setting table 100 (FIG. 10). As shown in FIG. 12, the brightness levels corresponding to color element levels 1–6 of the color element B are changed decreasingly toward the brightness level of 0. Thus, the intensity of blue light is reduced in an area around the character, whereby the character looks tinted with yellow. Herein, the "area around a character" corresponds to sub-pixels which are present in the vicinity of sub-pixels corresponding to a skeleton portion and whose color element level is set to any of color element levels 1–6. The color element level of each of the sub-pixels corresponding to the skeleton portion is set to color element level 7. Therefore, the sub-pixels corresponding to the skeleton portion remain black.

Alternatively, assuming a case where "red" is designated as the character color type C; FIG. 13 shows a brightness table obtained by changing the relationship between the color element levels and the brightness levels as defined in the standard brightness table 90 (FIG. 9) using the character color setting table 110 (FIG. 11). As shown in FIG. 13, the brightness levels corresponding to color element levels 1–6 of the color element R are changed increasingly toward the brightness level of 255. Thus, the intensity of red light is increased in an area around the character, whereby the character looks tinted with red.

FIG. 14 shows character color setting tables 140*a* and 140*b* which constitute another example of the character color setting table 42*d*.

The character color setting tables 140*a* and 140*b* define the shift quantity for the brightness level as defined in the standard brightness table 90 (FIG. 9).

In the character color setting tables 140*a*, "$M_1$" and "$M_2$" mean that brightness levels for a corresponding color element defined in the standard brightness table 90 are each shifted by shift quantities "$M_1$" or "$M_2$", respectively. As a result, the designated color element level, which has been set in step S9 (FIG. 8), is converted to a brightness level shifted by shift quantities "$M_1$" or "$M_2$" from the brightness level corresponding to the designated color element level as defined in the standard brightness table 90.

In the character color setting tables 140*a*, "0" means that the brightness level for a corresponding color element defined in the standard brightness table 90 is not shifted. As a result, a designated color element level, which has been set in step S9 (FIG. 8), is converted to the brightness level corresponding to the designated color element level according to the standard brightness table 90.

The character color setting table 140*b* defines the values of shift quantities "$M_1$" and "$M_2$" for the brightness level according to the color darkness N of a character.

Thus, the character color setting tables 140*a* and 140*b* change the relationship between the color element level of a sub-pixel and the brightness level of the sub-pixel as defined in the standard brightness table 90 according to character color information (i.e., the color type of a character or the color darkness of a character).

In the example shown in FIG. 14, the shift quantity for the brightness level is represented by a negative number (a shift quantity represented by a negative number reduces the brightness). However, the shift quantity for the brightness level may be represented by a positive number (a shift quantity represented by a positive number increases the brightness).

The change of the relationship between the color element level of a sub-pixel and the brightness level of the sub-pixel, which has been described with reference to FIGS. 9 and 14, is expressed by the following expressions (2-1) and (2-2):

When $L=L\max$ or $L=L\min$ (2-1)

$$D_{R(C,N)}'(L)=D_R(L)$$
$$D_{G(C,N)}'(L)=D_G(L)$$
$$D_{B(C,N)}'(L)=D_B(L)$$

When $L\min<L<L\max$ (2-2)

$$D_{R(C,N)}'(L)=\begin{cases} D_R(L\max) & D_R(L\max)<D_R(L)+M_{R(C,N)} \\ D_R(L)+M_{R(C,N)} & D_R(L\min)\leqq D_R(L)+M_{R(C,N)}\leqq D_R(L\max) \\ D_R(L\min) & D_R(L)+M_{R(C,N)}<D_R(L\min) \end{cases}$$

$$D_{G(C,N)}'(L)=\begin{cases} D_G(L\max) & D_G(L\max)<D_G(L)+M_{G(C,N)} \\ D_G(L)+M_{G(C,N)} & D_G(L\min)\leqq D_G(L)+M_{G(C,N)}\leqq D_G(L\max) \\ D_G(L\min) & D_G(L)+M_{G(C,N)}<D_G(L\min) \end{cases}$$

$$D_{B(C,N)}'(L)=\begin{cases} D_B(L\max) & D_B(L\max)<D_B(L)+M_{B(C,N)} \\ D_B(L)+M_{B(C,N)} & D_B(L\min)\leqq D_B(L)+M_{B(C,N)}\leqq D_B(L\max) \\ D_B(L\min) & D_B(L)+M_{B(C,N)}<D_B(L\min) \end{cases}$$

In these expressions, N denotes the darkness of color of a character. In the example shown in FIG. 14, N=0, 1, 2, 3, or 4.

$D_{R(C,N)}'(L)$ is a changed brightness level of a sub-pixel 14R which corresponds to the character color type C, the color darkness N of the character, and the color element level L. $D_{G(C,N)}'(L)$ is a changed brightness level of a sub-pixel 14G which corresponds to the character color type C, the color darkness N of the character, and the color element level L. $D_{B(C,N)}'(L)$ is a changed brightness level of a sub-pixel 14B which corresponds to the character color type C, the color darkness N of the character, and the color element level L.

$M_{R(C,N)}$ denotes the shift quantity for the brightness level of the sub-pixel 14R which corresponds to the character color type C and the color darkness N. $M_{G(C,N)}$ denotes the shift quantity for the brightness level of the sub-pixel 14G which corresponds to the character color type C and the color darkness N. $M_{B(C,N)}$ denotes the shift quantity for the brightness level of the sub-pixel 14B which corresponds to the character color type C and the color darkness N.

Assuming a case where "yellow" is designated as the color type C, and "2" is selected for the color darkness N of a character; FIG. 15 shows a brightness table obtained by changing the relationship between the color element levels and the brightness levels as defined in the standard brightness table 90 (FIG. 9) using the character color setting tables 140*a* and 140*b* (FIG. 14). As shown in FIG. 15, brightness levels corresponding to color element levels 1–6 for the color element B are changed decreasingly toward the brightness level of 0. Thus, the intensity of blue light is reduced in an area around the character, whereby the character looks tinted with yellow.

Alternatively, assuming a case where "red" is designated as the color type C, and "2" is selected for the color darkness N of a character; FIG. 16 shows a brightness table obtained by changing the relationship between the color element levels and the brightness levels as defined in the standard brightness table 90 (FIG. 9) using the character color setting tables 140*a* and 140*b* (FIG. 14). As shown in FIG. 16, brightness levels corresponding to color element levels 1–6 for the color elements G and B are changed decreasingly toward the brightness level of 0. Thus, the intensity of green light and blue light is reduced in an area around the character, whereby the character relatively looks tinted with red.

FIG. 17 shows character color setting tables 170*a* and 170*b* which constitute still another example of the character color setting table 42*d*.

The character color setting tables 170*a* and 170*b* define the rate of change for the brightness level as defined in the standard brightness table 90 (FIG. 9).

In the character color setting tables 170*a*, "$K_1$" and "$K_2$" each denotes the rate of change by which the brightness level defined by the standard brightness table 90 are to be multiplied. A designated color element level, which has been set in step S9 (FIG. 8), is converted to a brightness level obtained by multiplying the brightness level which corresponds to the designated color element level as defined in the standard brightness table 90 by the rate of change, "$K_1$" or "$K_2$".

In the character color setting tables 170*a*, "1" means that the brightness level defined in the standard brightness table 90 is not changed. As a result, a designated color element level, which has been set in step S9 (FIG. 8), is converted to the brightness level corresponding to the designated color element level as defined in the standard brightness table 90.

The character color setting table 170*b* defines the values for the rate of change, "$K_1$" and "$K_2$", for the brightness level according to the color darkness N of a character.

Thus, the character color setting tables 170*a* and 170*b* change the relationship between the color element level of a sub-pixel and the brightness level of the sub-pixel as defined in the standard brightness table 90 according to character color information (i.e., the color type of a character or the color darkness of a character).

In the case where the brightness level is represented by an integer, the change rate for the brightness level is preferably set to a value such that the multiplication can be replaced by a bit shift and an addition/subtraction. This is because the brightness level can be easily calculated only with integers. Thus, the calculation cost and the hardware size can be reduced.

The change of the relationship between the color element level of a sub-pixel and the brightness level of the sub-pixel, which has been described with reference to FIGS. 9 and 17, is expressed by the following expressions (3-1) and (3-2):

When $L=L\max$ or $L=L\min$ (3-1)

$$D_{R(C,N)}'(L)=D_R(L)$$

$$D_{G(C,N)}'(L)=D_G(L)$$

$$D_{B(C,N)}'(L)=D_B(L)$$

When $L\min<L<L\max$ (3-2)

$$D_{R(C,N)}'(L)=\begin{cases} D_R(L\max) & D_R(L\max)<D_R(L)\times K_{R(C,N)} \\ D_R(L)\times K_{R(C,N)} & D_R(L\min)\leqq D_R(L)\times K_{R(C,N)}\leqq D_R(L\max) \\ D_R(L\min) & D_R(L)\times K_{R(C,N)}<D_R(L\min) \end{cases}$$

$$D_{G(C,N)}'(L)=\begin{cases} D_G(L\max) & D_G(L\max)<D_G(L)\times K_{G(C,N)} \\ D_G(L)\times K_{G(C,N)} & D_G(L\min)\leqq D_G(L)\times K_{G(C,N)}\leqq D_G(L\max) \\ D_G(L\min) & D_G(L)\times K_{G(C,N)}<D_G(L\min) \end{cases}$$

$$D_{B(C,N)}'(L)=\begin{cases} D_B(L\max) & D_B(L\max)<D_B(L)\times K_{B(C,N)} \\ D_B(L)\times K_{B(C,N)} & D_B(L\min)\leqq D_B(L)\times K_{B(C,N)}\leqq D_B(L\max) \\ D_B(L\min) & D_B(L)\times K_{B(C,N)}<D_B(L\min) \end{cases}$$

In these expressions, $K_{R(C,N)}$ denotes the change rate for the brightness level of a sub-pixel 14R which corresponds to a color type C and a color darkness N of a character. $K_{G(C,N)}$ denotes the change rate for the brightness level of a sub-pixel 14G which corresponds to the color type C and the color darkness N of the character. $K_{B(C,N)}$ denotes the change rate for the brightness level of a sub-pixel 14B which corresponds to the color type C and the color darkness N of the character.

Assuming a case where "yellow" is designated as the color type C, and "2" is selected for the color darkness N of a character; FIG. 18 shows a brightness table obtained by changing the relationship between the color element levels and the brightness levels as defined in the standard brightness table 90 (FIG. 9) using the character color setting tables 170*a* and 170*b* (FIG. 17). As shown in FIG. 18, brightness levels corresponding to color element levels 1–6 for the color element B are changed decreasingly toward the brightness level of 0. Thus, the intensity of blue light is reduced in an area around the character, whereby the character looks tinted with yellow.

Alternatively, assuming a case where "red" is designated as the color type C, and "2" is selected for the color darkness of a character; FIG. 19 shows a brightness table obtained by changing the relationship between the color element levels and the brightness levels as defined in the standard brightness table 90 (FIG. 9) using the character color setting tables 170*a* and 170*b* (FIG. 17). As shown in FIG. 19, brightness levels corresponding to color element levels 1–6 for the color elements G and B are changed decreasingly toward the brightness level of 0. Thus, the intensity of green light and blue light is reduced in an area around the character, whereby the character relatively looks tinted with red.

In the case where the brightness level is changed using the predetermined change rate as described above, the variation (shift quantity) of the brightness level is not constant. Specifically, the variation (shift quantity) of a smaller brightness level is relatively small, whereas the variation (shift quantity) of a greater brightness level is relatively large.

As described hereinabove, by changing the relationship between the color element level of a sub-pixel and the brightness level of the sub-pixel according to the character color type or the character color darkness, a virtual single color of a character displayed on the display device 10 can be changed. Thus, by changing the relationship between the color element level of a sub-pixel and the brightness level of the sub-pixel along with the passage of time, the virtual single color of a character displayed on the display device 10 can be changed along with the passage of time.

FIG. 20 shows a character color setting table 200*a* for times $t=T_1$, $T_2$, and $T_3$, which is still another example of the character color setting table 42*d*.

The character color setting table 200*a* defines the shift quantities, $M_1(t)$ and $M_2(t)$, for the brightness level defined in the standard brightness table 90 (FIG. 9). Herein, the shift quantities, $M_1(t)$ and $M_2(t)$, are determined so that each of the shift quantities, $M_1(t)$ and $M_2(t)$, is a function of time t.

Based on the character color setting table 200*a*, the shift quantity for the brightness level is changed along with the passage of time, whereby the color darkness of a character can be changed along with the passage of time.

Alternatively, the shift quantity of the brightness level can be related to the color darkness N(t) of a character, so that the color darkness N(t) is a function of time t. The color darkness of a character can be changed along with the passage of time.

Alternatively, the color type of a character may be changed along with the passage of time. For example, the color type of a character may be changed so that the color type of a character at time $T_1$ is "no color", the color type of the character at time $T_2$ is "yellow", and the color type of the character at time $T_3$ is "magenta". Moreover, both the color darkness of a character and the color type of the character can be changed along with the passage of time.

According to the present invention, the parameter used as a function of time t is not limited to the shift quantity of the brightness level. The shift number for a color element level can be selected as a function of time t. In the case where the relationship between the color element level of a sub-pixel and the brightness level of the sub-pixel depends on one or more parameters, it is only needed to select at least one of the parameters as a function of time t. Thus, it is within the scope of the present invention to change the color of a character by changing along with the passage of time any parameter which is related to the relationship between the color element level of a sub-pixel and the brightness level of the sub-pixel.

(Embodiment 2)

Figure 2C:
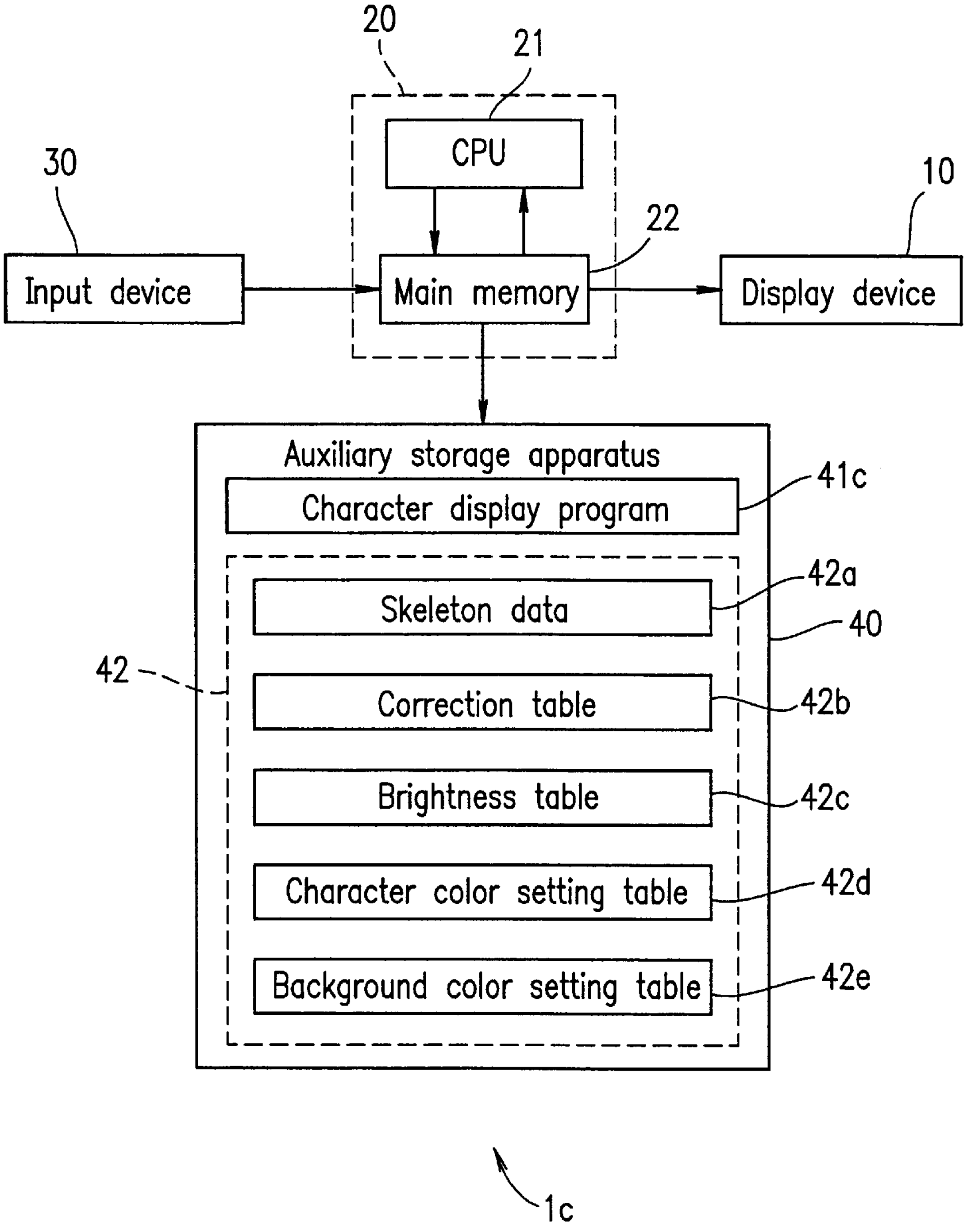
FIGS. 2C and 2D respectively illustrate structures of character display apparatuses 1*c* and 1*d* according to Embodiment 2 of the present invention.

FIG. 2C illustrates a structure of a character display apparatus 1*c* according to Embodiment 2 of the present invention. An auxiliary storage apparatus 40 stores a character color setting table 42*d* and a background color setting table 42*e* in addition to a brightness table 42*c*.

The background color setting table 42*e* is used for changing the relationship between the color element level of a sub-pixel and the brightness level of the sub-pixel according to background color information.

Figure 21:
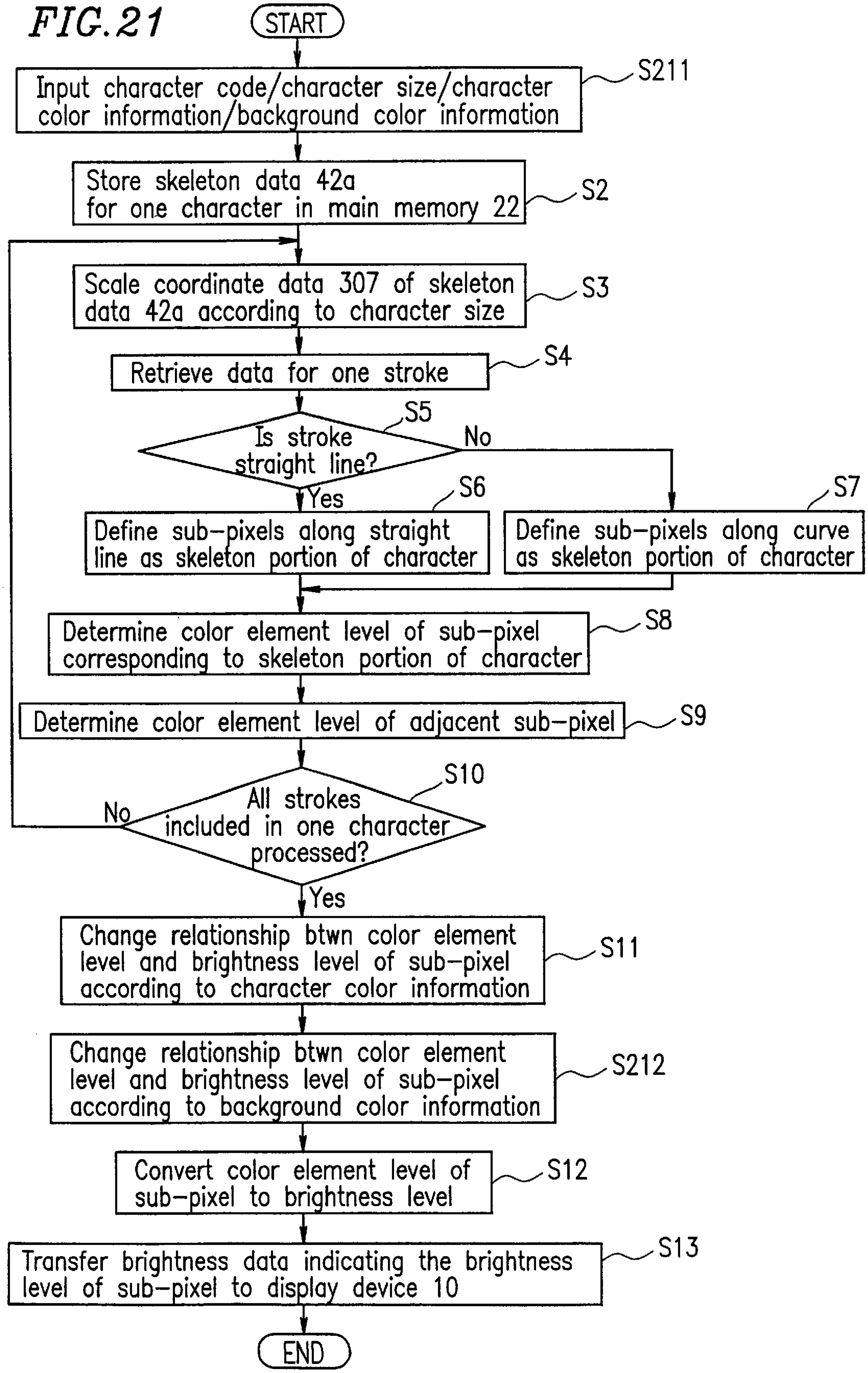
FIG. 21 illustrates a procedure for processing a character display program 41*c*.

FIG. 21 illustrates a procedure for processing the character display program 41*c*. The character display program 41*c* is executed by the CPU 21. In FIG. 21, the same steps as those in FIG. 8 are denoted by the same step numbers, and the descriptions thereof are herein omitted.

Step S211: A character code, a character size, character color information, and background color information are input through the input device 30. The background color information defines the background color of a character to be displayed on the display device 10. For example, the background color information includes information representing the color type of the background of a character and information representing the darkness of the background color of the character. Herein, the "background of a character" is an area corresponding to sub-pixels which is in the vicinity of the character (e.g., in a rectangular area having a predetermined size which includes the character) whose color element level is set to Lmin (e.g., 0).

Step S212: The relationship between the color element level of each sub-pixel and the brightness level of the sub-pixel is changed according to the background color information.

FIG. 22 shows a background color setting table 220 which is an example of the background color setting table 42*e*.

The background color setting table 220 defines a shift number (positive number) for a color element level.

In the background color setting table 220, "+1" means that color element levels for a corresponding color element after the relationship between the color element levels and the brightness levels has been changed according to the character color information are each shifted by +1. As a result, the designated color element level is converted to a brightness level corresponding to a color element level which is one level greater than the designated color element level according to the brightness table obtained by changing the relationship between the color element levels and the brightness levels according to the character color information. However, in the case where the shifted color element level is greater than the maximum color element level, the designated color element level is converted to a brightness level corresponding to the maximum color element level.

In the background color setting table 220, "0" means that color element levels for a corresponding color element in the relationship between the color element levels and the brightness levels which has been changed according to the character color information are not shifted. As a result, the designated color element level is converted to a brightness level corresponding to the designated color element level according to the brightness table obtained by changing the relationship between the color element levels and the brightness levels according to the character color information.

In this way, after the relationship between the color element levels and the brightness levels has been changed according to the character color information, the background color setting table 220 further changes the relationship between the color element level of each sub-pixel and the brightness level of the sub-pixel according to the background color information.

The change of the relationship between the color element level of each sub-pixel and the brightness level of the sub-pixel, which has been described with reference to FIG. 22, is expressed by the following expressions (4-1) and (4-2):

When $L=L\text{min}$ (4-1)

$$D_{R(C,BC)''}(L) = D_R(L+S_{R'(BC)})$$

$$D_{G(C,BC)''}(L) = D_G(L+S_{G'(BC)})$$

$$D_{B(C,BC)''}(L) = D_B(L+S_{B'(BC)})$$

When $L\text{min}<L$ (4-2)

$$D_{R(C,BC)''}(L) = \begin{cases} D_{R(C)'}(L) & D_{R(C)'}(L) \leqq D_R(L+S_{R'(BC)}) \\ D_{R(C,BC)''}(L\text{min}) & D_{R(C)'}(L) > D_R(L+S_{R'(BC)}) \end{cases}$$

-continued $$D_{G(C,BC)''}(L)=\begin{cases} D_{G(C)'}(L) & D_{G(C)'}(L)\leqq D_G(L+S_{G'(BC)}) \\ D_{G(C,BC)''}(L\mathrm{min}) & D_{G(C)'}(L)>D_G(L+S_{G'(BC)}) \end{cases}$$

$$D_{B(C,BC)''}(L)=\begin{cases} D_{B(C)'}(L) & D_{B(C)'}(L)\leqq D_B(L+S_{B'(BC)}) \\ D_{B(C,BC)''}(L\mathrm{min}) & D_{B(C)'}(L)>D_B(L+S_{B'(BC)}) \end{cases}$$

In these expressions, $D_{R(C)}'(L)$ is a brightness level of a sub-pixel 14R corresponding to the color element level L which has been changed according to the character color type C; $D_{G(C)}'(L)$ is a brightness level of a sub-pixel 14G corresponding to the color element level L which has been changed according to the character color type C; and $D_{B(C)}'(L)$ is a brightness level of a sub-pixel 14B corresponding to the color element level L which has been changed according to the character color type C.

$D_{R(C,BC)}''(L)$ is a brightness level of a sub-pixel 14R corresponding to the color element level L which has been further changed according to the background color type BC: $D_{G(C,BC)}''(L)$ is a brightness level of a sub-pixel 14G corresponding to the color element level L which has been further changed according to the background color type BC; and $D_{B(C,BC)}''(L)$ is a brightness level of a sub-pixel 14B corresponding to the color element level L which has been further changed according to the background color type BC.

$S_{R'(BC)}$ denotes a shift number for the color element level of the sub-pixel 14R which corresponds to the background color type BC; $S_{G'(BC)}$ denotes a shift number for the color element level of the sub-pixel 14G which corresponds to the background color type BC; and $S_{B'(BC)}$ denotes a shift number for the color element level of the sub-pixel 14B which corresponds to the background color type BC.

Assuming a case where "no color" is designated as the character color type C, and "yellow" is designated as the background color type BC; FIG. 23 shows a brightness table obtained by further changing the relationship between the color element levels and the brightness levels according to the background color information using the background color setting table 220 (FIG. 22) after the relationship between the color element levels and the brightness levels has been changed according to the character color information. As shown in FIG. 23, a brightness level corresponding to color element level 0 for the color element B is decreasingly changed. Thus, the intensity of blue light is reduced in the background of the character, whereby the background of the character looks tinted with yellow.

Alternatively, assuming a case where "cyan" is designated as the character color type C, and "yellow" is designated as the background color type BC: FIG. 24 shows a brightness table obtained by further changing the relationship between the color element levels and the brightness levels according to the background color information BC using the background color setting table 220 (FIG. 22) after the relationship between the color element levels and the brightness levels has been changed according to the character color information C. As shown in FIG. 24, brightness levels corresponding to color element levels 1–6 for the color element R are changed decreasingly toward the brightness level of 0, and a brightness level corresponding to color element level 0 for the color element B is changed decreasingly. Thus, the intensity of red light is reduced in an area around the character, whereby the character looks tinted with cyan. Moreover, the intensity of blue light is reduced in the background of the character, whereby the background of the character looks tinted with yellow.

Figure 2D:
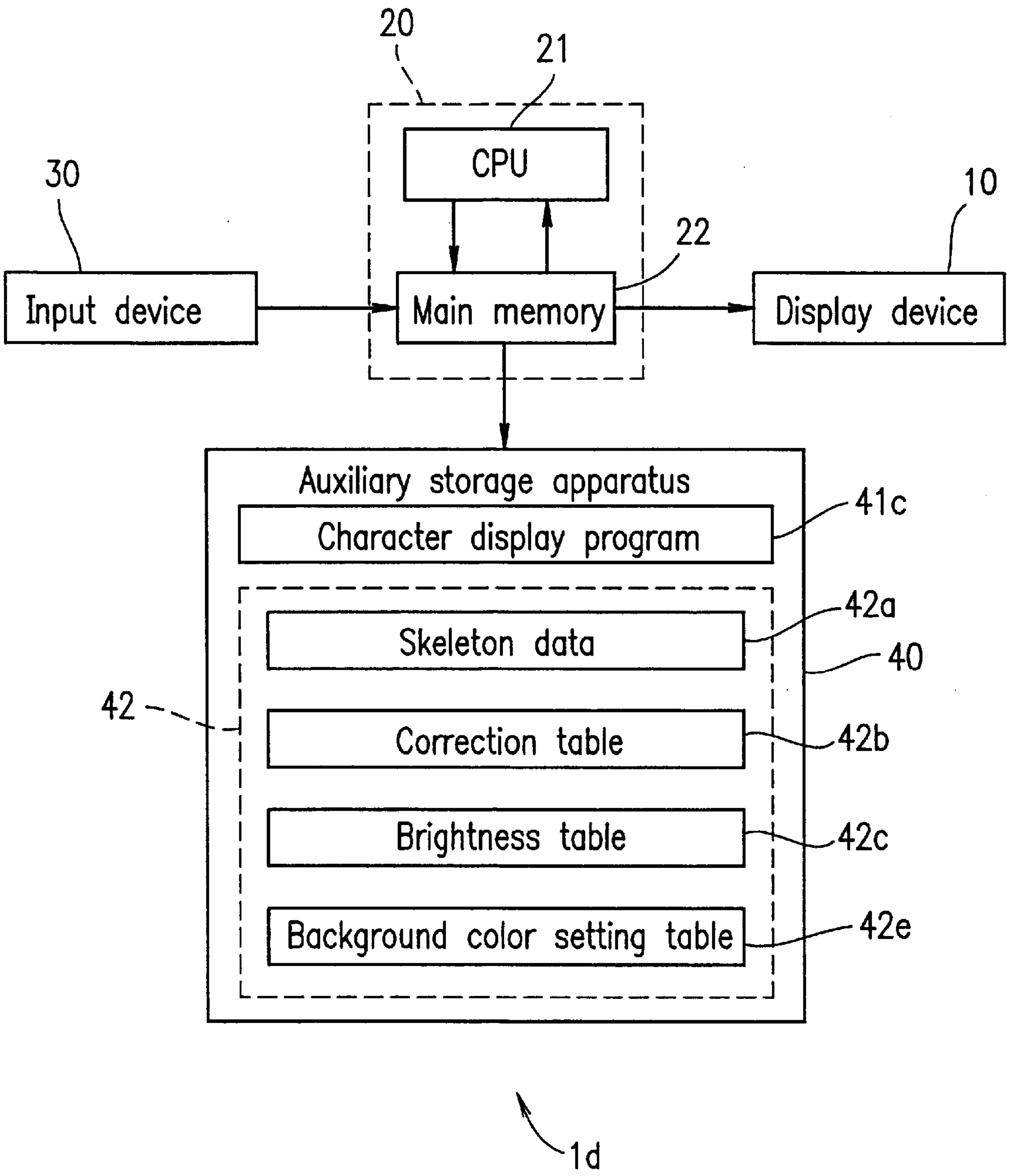

Alternatively, only the background color may be designated without designating the color type of a character. In this case, it is not necessary to previously store a character color setting table in the auxiliary storage apparatus 40. The character display apparatus 1*d* is structured as shown in FIG. 2D. Moreover, In step S211 of the character display program 41*c* shown in FIG. 21, it is not necessary to input character color information, and therefore, step S211 can be omitted. It is only required to change, in step S212, the relationship between the color element level of a sub-pixel and the brightness level of the sub-pixel which is defined in the standard brightness table 90 (FIG. 9).

FIG. 25 shows background color setting tables 250*a* and 250*b* which constitute another example of the background color setting table 42*e*.

The background color setting tables 250*a* and 250*b* define the shift quantity for the brightness level.

In the background color setting tables 250*a*, "$BM_1$" and "$BM_2$" mean that the brightness level is shifted by "$BM_1$" and "$BM_2$", respectively. "0" means that the brightness level is not shifted.

The background color setting table 250*b* defines values of the shift quantities "$BM_1$" and "$BM_2$" for the brightness level according to the background color darkness BN.

Thus, the background color setting tables 250*a* and 250*b* are used for further changing the relationship between the color element level of a sub-pixel and the brightness level of the sub-pixel according to the background color information which has been changed according to the character color information.

The change of the relationship between the color element level of each sub-pixel and the brightness level of the sub-pixel, which has been described with reference to FIG. 25, is expressed by the following expressions (5-1) and (5-2):

When $L=L\mathrm{min}$ (5-1)

$$D_{R(C,N,BC,BN)''}(L)=D_R(L)+M_{R'(BC,BN)}$$

$$D_{G(C,N,BC,BN)''}(L)=D_G(L)+M_{G'(BC,BN)}$$

$$D_{B(C,N,BC,BN)''}(L)=D_B(L)+M_{B'(BC,BN)}$$

When $L\mathrm{min}<L$ (5-2)

$$D_{R(C,N,BC,BN)''}(L)=\begin{cases} D_{R(C,N)'}(L) & D_{R(C,N)'}(L)\leqq D_R(L)+M_{R'(BC,BN)} \\ D_{R(C,N,BC,BN)''}(L\mathrm{min}) & D_{R(C,N)'}(L)>D_R(L)+M_{R'(BC,BN)} \end{cases}$$

$$D_{G(C,N,BC,BN)''}(L)=\begin{cases} D_{G(C,N)'}(L) & D_{G(C,N)'}(L)\leqq D_G(L)+M_{G'(BC,BN)} \\ D_{G(C,N,BC,BN)''}(L\mathrm{min}) & D_{G(C,N)'}(L)>D_G(L)+M_{G'(BC,BN)} \end{cases}$$

$$D_{B(C,N,BC,BN)''}(L)=\begin{cases} D_{B(C,N)'}(L) & D_{B(C,N)'}(L)\leqq D_B(L)+M_{B'(BC,BN)} \\ D_{B(C,N,BC,BN)''}(L\mathrm{min}) & D_{B(C,N)'}(L)>D_B(L)+M_{B'(BC,BN)} \end{cases}$$

In these expressions, $D_{R(C,N)}'(L)$ is a brightness level of a sub-pixel 14R corresponding to the color element level L which has been changed according to the character color type C and the color darkness N of the character: $D_{G(C,N)}'(L)$ is a brightness level of a sub-pixel 14G corresponding to the color element level L which has been changed according to the character color type C and the color darkness N of the character; and $D_{B(C,N)}'(L)$ is a brightness level of a sub-pixel 14B corresponding to the color element level L which has been changed according to the character color type C and the color darkness N of the character.

$D_{R(C,N,BC,BN)}''(L)$ is a brightness level of the sub-pixel 14R corresponding to the color element level L which has been further changed according to the background color type BC and the background color darkness BN; $D_{G(C,N,BC,BN)}''(L)$ is a brightness level of the sub-pixel 14G corresponding to the color element level L which has been further changed according to the background color type BC and the background color darkness BN; and $D_{B(C,N,BC,BN)}''(L)$ is a brightness level of the sub-pixel 14B corresponding to the color element level L which has been further changed according to the background color type BC and the background color darkness BN.

$M_{R'(BC,BN)}$ is a shift quantity for the brightness level of the sub-pixel 14R which corresponds to the background color type BC and the background color darkness BN; $M_{G'(BC,BN)}$ is a shift quantity for the brightness level of the sub-pixel 14G which corresponds to the background color type BC and the background color darkness BN; and $M_{B'(BC,BN)}$ is a shift quantity for the brightness level of the sub-pixel 14B which corresponds to the background color type BC and the background color darkness BN.

Assuming a case where "magenta" is designated as the background color type C, and "3" is designated as the background color darkness BN; FIG. 26 shows a brightness table obtained by further changing the relationship between the color element levels and the brightness levels using the background color setting tables 250*a* and 250*b* (FIG. 25) after the relationship between the color element levels and the brightness levels has been changed according to the character color information. As shown in FIG. 26, a brightness level corresponding to color element level 0 for the color element G is decreasingly changed. Along with this, the brightness level corresponding to color element level 1 for the color element G is changed to a brightness level which is equal to the brightness level corresponding to color element level 0 for the color element G, i.e., changed to 207. Thus, the intensity of green light is reduced in the background of the character, whereby the background of the character looks tinted with magenta.

In another example of embodiment 2, a set of brightness levels ($V_R$, $V_G$, $V_B$) for the color elements (R, G, B) is given as background color information. In this case, the relationship between the color element level of each sub-pixel and the brightness level of the sub-pixel is changed so that a brightness level corresponding to color element level 0 (=Lmin) for each color element is equal to the given brightness level ($V_R$, $V_G$, or $V_B$). This modification is made in such a manner that any brightness level does not exceed the given brightness level ($V_R$, $V_G$, $V_B$) for each color element.

In this case, the change of the relationship between the color element level of each sub-pixel and the brightness level of the sub-pixel is expressed by the following expressions (6-1) and (6-2):

When $L = L\min$ (6-1)

$$D'_R(L) = V_R$$

$$D'_G(L) = V_G$$

$$D'_B(L) = V_B$$

When $L\min < L$ (6-2)

$$D'_R(L) = \begin{cases} D_R(L) & D_R(L) \leqq V_R \\ V_R & D_R(L) > V_R \end{cases}$$

$$D'_G(L) = \begin{cases} D_G(L) & D_G(L) \leqq V_G \\ V_G & D_G(L) > V_G \end{cases}$$

$$D'_B(L) = \begin{cases} D_B(L) & D_B(L) \leqq V_B \\ V_B & D_B(L) > V_B \end{cases}$$

In these expressions, $V_R$ is any brightness level given for the color element R; $V_G$ is any brightness level given for the color element G; and $V_B$ is any brightness level given for the color element B.

Assuming a case where a set of brightness levels ($V_R$, $V_G$, $V_B$)=(200, 255, 219) is assigned as the background color information; FIG. 27 is a new brightness table obtained by changing the relationship between the color element levels and the brightness levels as defined in the standard brightness table 90 (FIG. 9) according to expressions (6-1) and (6-2). As shown in FIG. 27, the brightness levels corresponding to color element level 0 has been changed to the given brightness levels (200, 255, 219). Along with this, the brightness level corresponding to color element level 1 for the color element R is reduced to 200, which is equal to the brightness level corresponding to color element level 0 for the color element R.

Thus, the relationship between the color element level of each sub-pixel and the brightness level of the sub-pixel can be changed using a given brightness level as background color information.

As in a case where a color of a character is changed along with the passage of time, a background color of a character can be changed by changing any parameter associated with the relationship between the color element level of each sub-pixel and the brightness level of the sub-pixel along with the passage of time.

For example, as shown in FIG. 28, the shift quantity of the brightness level, $M_1(t)$ and $M_2(t)$, can be related to time t so that the shift quantity of the brightness is a function of time t. With such an association, the color darkness of a background color can be changed along with the passage of time. Therefore, a different background color darkness can be produced for times $T_1$, $T_2$, and $T_3$.

Moreover, the background color type may be changed along with the passage of time. For example, the background color type may be changed so that the background color type is "no color" at time $t=T_1$, the background color type is "yellow" at time $t=T_2$, and the background color type is "magenta" at time $t=T_3$. Furthermore, both the color darkness of a background color and the background color type can be changed along with the passage of time.

(Embodiment 3)

In many cases, characters are displayed in black on a white background. However, for the purpose of emphasizing a word or for design necessity, a character color and a background color are sometimes replaced with each other.

Figure 2E:
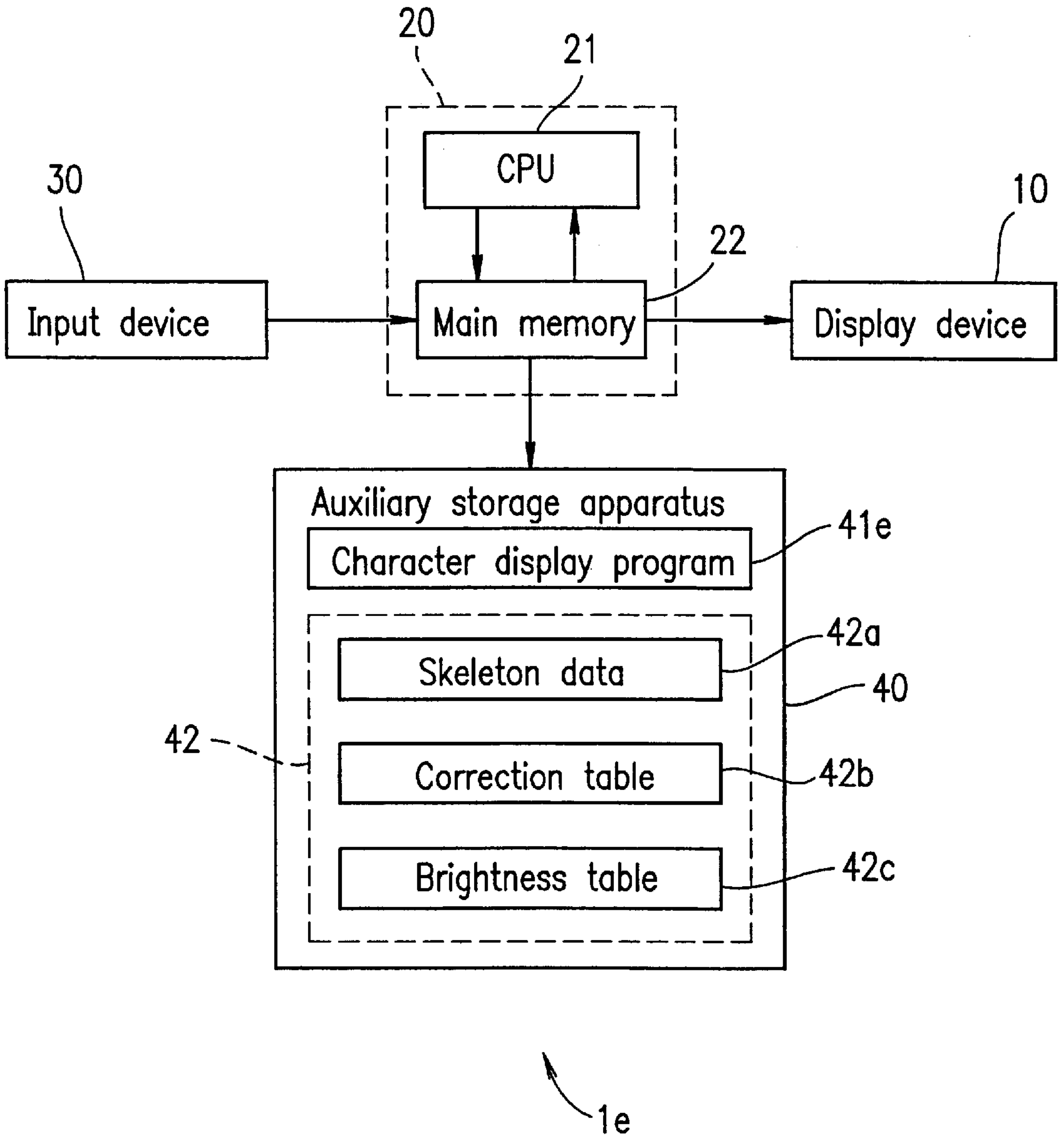
FIGS. 2E and 2F respectively illustrate structures of character display apparatuses 1*e* and 1*f* according to Embodiment 3 of the present invention.

FIG. 2E illustrates a structure of a character display apparatus 1*e* according to Embodiment 3 of the present invention. The character display apparatus 1*e* has a function for replacing a character color and a background color (i.e., reverse display of a character).

The structure of the character display apparatus 1*e* is the same as that of the character display apparatus 1*a* (FIG. 2A) except that a character display program 41*e* is stored in place of the character display program 41*a* in the auxiliary storage apparatus 40.

Figure 29:
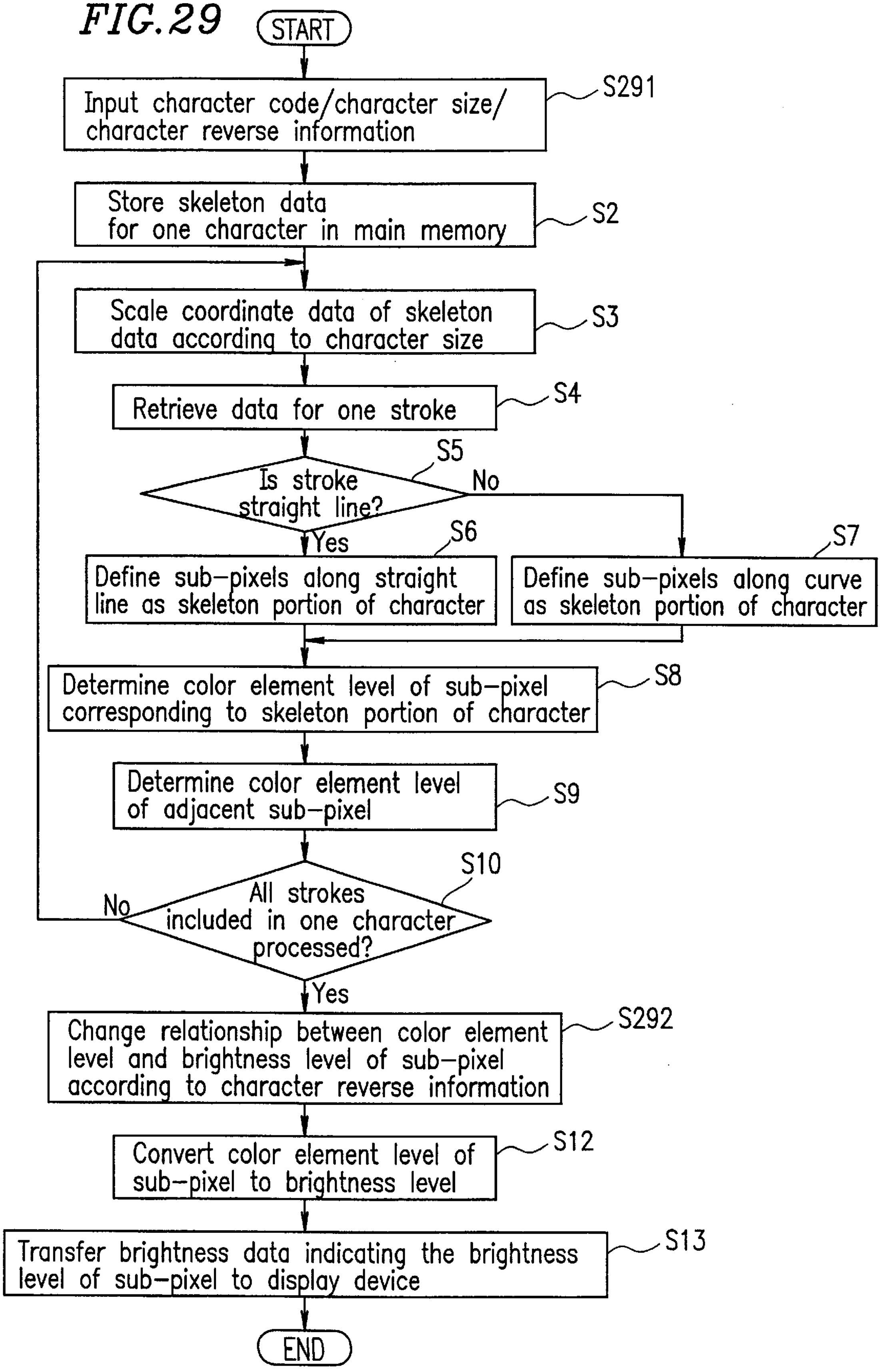
FIG. 29 illustrates a procedure for processing a character display program 41*e*.

FIG. 29 illustrates a procedure for processing the character display program 41*e*. The character display program 41*e* is executed by the CPU 21. In FIG. 29, the same steps as those in FIG. 8 are denoted by the same step numbers, and the descriptions thereof are herein omitted.

Step S291: A character code, a character size, and character reverse information are input through the input device 30. The character reverse information includes information representing whether a character is reversely displayed or not.

Step S292: The relationship between the color element level of each sub-pixel and the brightness level of the sub-pixel is changed according to the character reverse information.

For example, in the case where no color is added to a character, such a change of the relationship is expressed by following expressions (7-1) and (7-2):

When $L=L\text{min}$ or $L=L\text{max}$ (7-1)

$$D'_R(L) = D_R(L\text{max} - L)$$
$$D'_G(L) = D_G(L\text{max} - L)$$
$$D'_B(L) = D_B(L\text{max} - L)$$

When $L\text{min}<L<L\text{max}$ (7-2)

$$D'_R(L) = D_R(L\text{max} - L) + M$$
$$D'_G(L) = D_G(L\text{max} - L) + M$$
$$D'_B(L) = D_B(L\text{max} - L) + M$$

In these expressions, M is a shift quantity which is equal for all of the three color elements.

FIG. 30 is a new brightness table obtained by changing the relationship between the color element levels and the brightness levels as defined in the standard brightness table 90 (FIG. 9) based on expressions (7-1) and (7-2). Specifically, the brightness levels corresponding to color element levels 0–7 as defined in the standard brightness table 90 are rearranged in an opposite order so as to correspond to color element levels 7–0. Then, the brightness levels corresponding to color element levels except for the maximum and minimum color element levels (color element levels 7 and 0) are each shifted by a shift quantity M (=+36) for each color element, whereby the brightness table as shown in FIG. 30 is obtained. In the case where the shifted brightness level is greater than the maximum brightness level, the shifted brightness level is adjusted so as to be equal to the maximum brightness level. Similarly, in the case where the shifted brightness level is smaller than the minimum brightness level, the shifted brightness level is adjusted so as to be equal to the minimum brightness level.

By converting the color element level of a sub-pixel into a brightness level according to the brightness table shown in FIG. 30, the character is displayed in white on a black background. Furthermore, a white character can be displayed brighter and clearer.

Figure 2F:
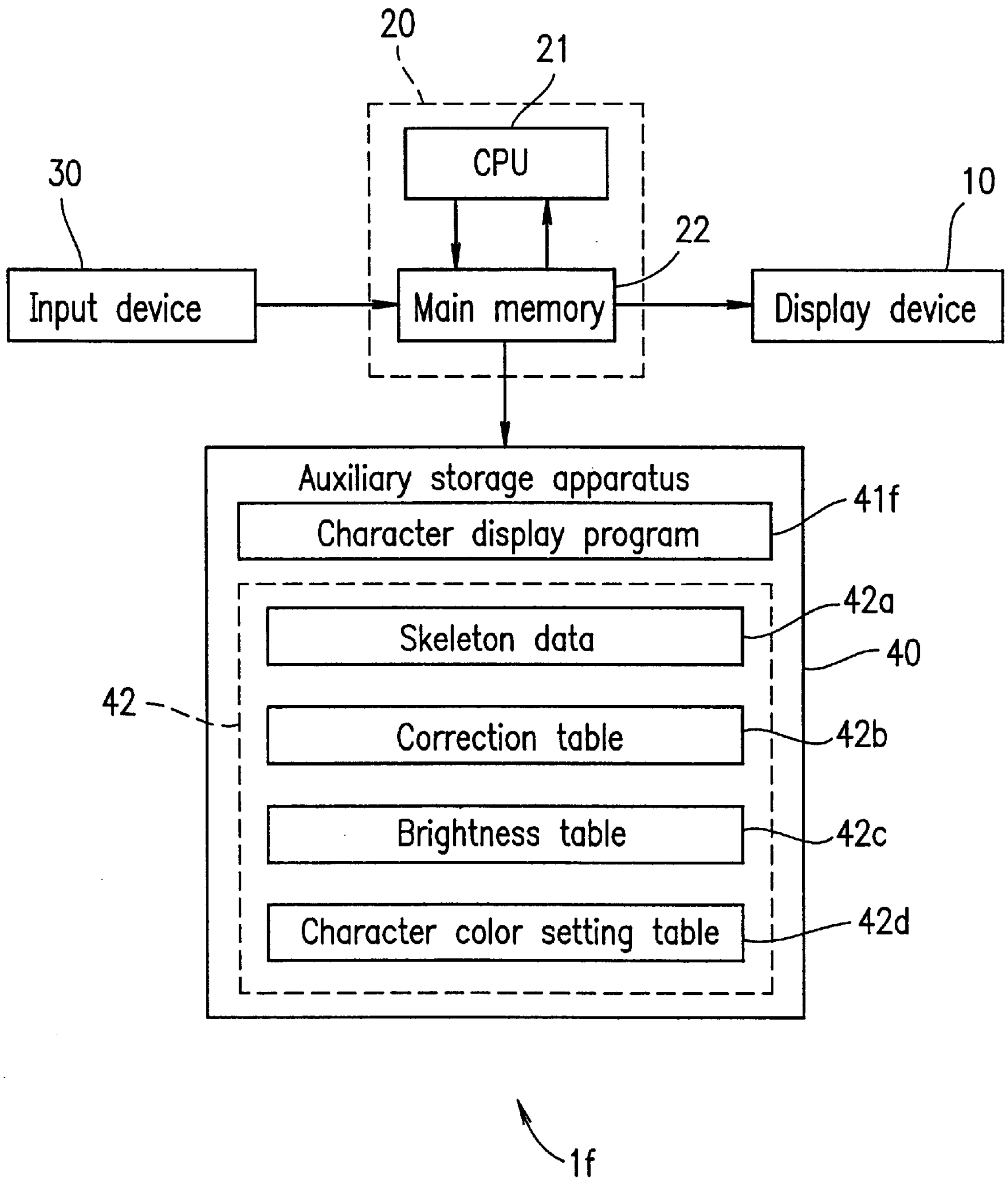

FIG. 2F illustrates a structure of a character display apparatus 1*f* according to Embodiment 3 of the present invention. The character display apparatus 1*f* has, in addition to a function for reversely displaying a character, a function for adding a color to the reversely displayed character.

The structure of the character display apparatus 1*f* is the same as that of the character display apparatus 1*b* (FIG. 2B) except that a character display program 41*f* is stored in place of the character display program 41*a* in the auxiliary storage apparatus 40.

Figure 31:
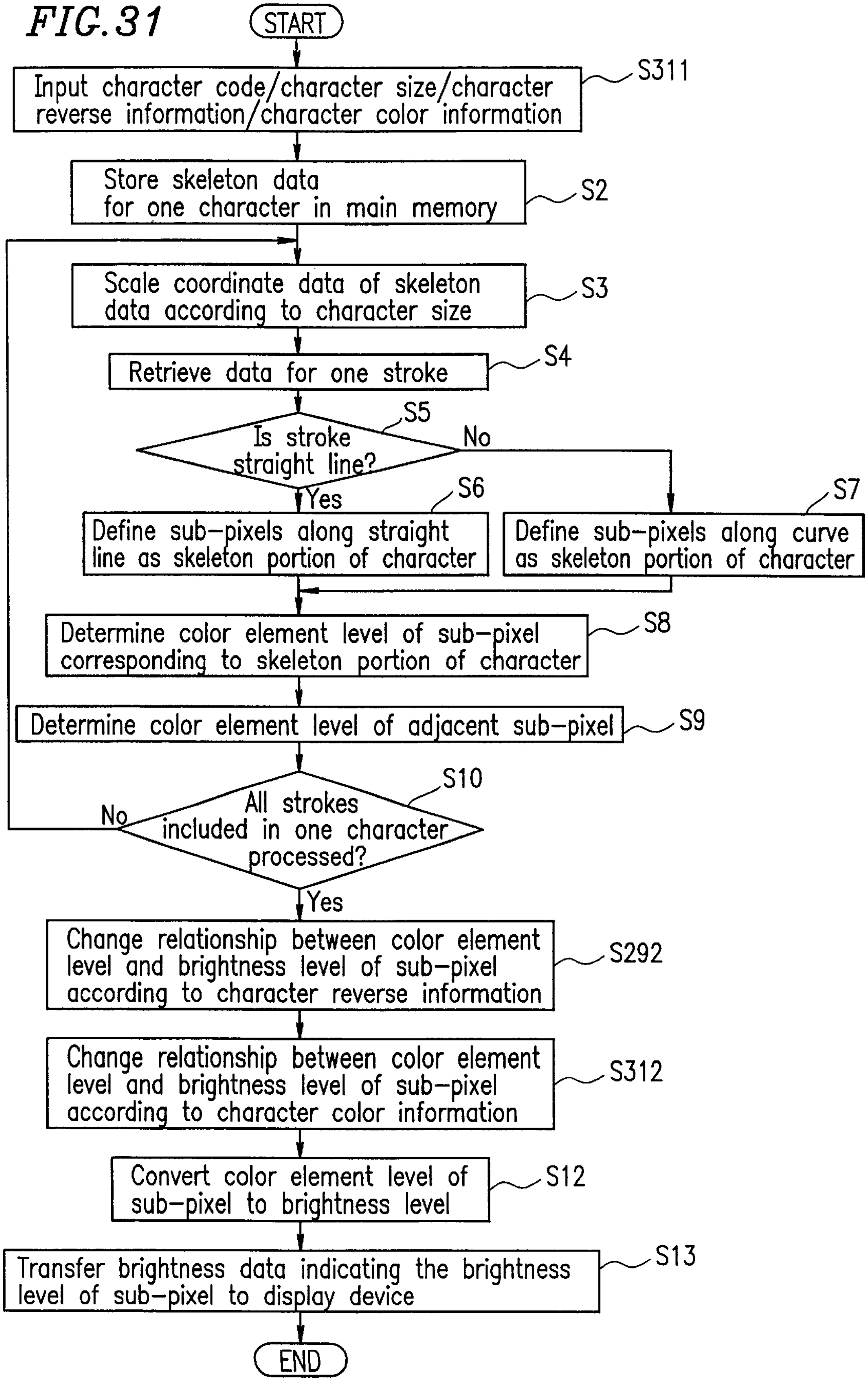
FIG. 31 illustrates a procedure for processing a character display program 41*f*.

FIG. 31 illustrates a procedure for processing the character display program 41*f*. The character display program 41*f* is executed by the CPU 21. In FIG. 31, the same steps as those in FIGS. 8 and 29 are denoted by the same step numbers, and the descriptions thereof are herein omitted.

Step S311: A character code, a character size, character reverse information, and character color information are input through the input device 30. The character reverse information includes information representing whether a character is reversely displayed or not. The character color information includes information representing a color type of a character and information representing a color darkness of the character.

Step S312: The relationship between the color element level of each sub-pixel and the brightness level of the sub-pixel, which has been once changed according to the character reverse information at step S292, is further changed according to the character color information.

For example, in the case where any color is added to a character, such a change of the relationship is expressed by following expressions (8-1) and (8-2):

When $L=L\text{min}$ or $L=L\text{max}$ (8-1)

$$D'_R(L) = D_R(L\text{max} - L)$$
$$D'_G(L) = D_G(L\text{max} - L)$$
$$D'_B(L) = D_B(L\text{max} - L)$$

When $L\text{min}<L<L\text{max}$ (8-2)

$$D'_R(L) = D_R(L\text{max} - L) + M + M_R$$
$$D'_G(L) = D_G(L\text{max} - L) + M + M_G$$
$$D'_B(L) = D_B(L\text{max} - L) + M + M_B$$

In these expressions, M is a shift quantity which is equal for all of the three color elements. $M_R$ is a shift quantity for the color element R; $M_G$ is a shift quantity for the color element G; and $M_B$ is a shift quantity for the color element B.

In order to change the relationship between the color element level of each sub-pixel and the brightness level of the sub-pixel according to character color information, the character color setting tables described in embodiment 1 (e.g., the character color setting tables 140*a* and 140*b* (FIG. 14), or the character color setting tables 170*a* and 170*b* (FIG. 17)) are employed. Furthermore, the character color setting tables 100 (FIG. 10) and 110 (FIG. 11) can be used by reversing the positive/negative signs ("+"/"−") shown in these tables.

FIG. 32 is a new brightness table obtained by changing the relationship between the color element levels and the brightness levels defined in the standard brightness table 90 (FIG. 9) based on expressions (8-1) and (8-2). Specifically, the brightness levels corresponding to color element levels 0–7 as defined in the standard brightness table 90 are rearranged in an opposite order so as to correspond to color element levels 7–0. Then, the brightness levels corresponding to color element levels except for the maximum and minimum color element levels (color element levels 7 and 0) are each shifted by a shift quantity M (=+36) for each color element. Furthermore, the brightness levels corresponding to color element levels except for the maximum and minimum color element levels (color element levels 7 and 0) are each shifted by a shift quantity $M_G$ (=+36) for the color element G, whereby the brightness table as shown in FIG. 32 is obtained. In the case where the shifted brightness level is greater than the maximum brightness level, the shifted brightness level is adjusted so as to be equal to the maximum brightness level. Similarly, in the case where the shifted brightness level is smaller than the minimum brightness level, the shifted brightness level is adjusted so as to be equal to the minimum brightness level. In the example shown in FIG. 32, $M_R=M_B=0$.

By converting the color element level of a sub-pixel into a brightness level according to the brightness table shown in FIG. 32, the character is reversely displayed, and the intensity of green light is increased in an area around the character, whereby the character looks tinted with green.

Figure 33A:
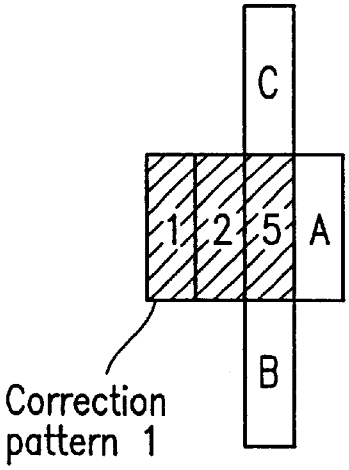
FIGS. 33A and 33B illustrate how to determine the color element level for sub-pixels arranged adjacent to the left side of a sub-pixel which corresponds to the skeleton portion of a character.
Figure 33B:
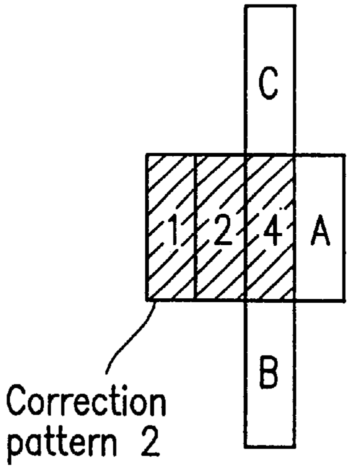

FIGS. 33A and 33B illustrate how to determine the color element level for sub-pixels arranged adjacent to the left side of a sub-pixel which corresponds to the skeleton portion of the character.

The color element levels of sub-pixels each arranged adjacent to the left side of a sub-pixel which corresponds to the skeleton portion of the character are determined in the downward direction, irrespective of the direction of the straight line between the start point and the end point of the stroke.

Referring to FIGS. 33A and 33B, the sub-pixel A corresponding to the skeleton portion of the character is assumed to be a reference sub-pixel, the sub-pixel located on the left lower side of the reference sub-pixel A is assumed to be a sub-pixel B, and the sub-pixel located on the left upper side of the reference sub-pixel A is assumed to be a sub-pixel C.

When at least one of the sub-pixel B and the sub-pixel C corresponds to the skeleton portion of the character, the color element level of the sub-pixel adjacent to the left side of the sub-pixel A is determined according to the correction pattern 1 of the correction table 42*b*. This corresponds to the case illustrated in FIG. 33A. For example, when the correction table 60 (FIG. 6) is used as the correction table 42*b*, the correction pattern 1 is a pattern: "5", "2", "1". Therefore, the color element levels of the three sub-pixels adjacent to the left side of the sub-pixel A are set to "5", "2" and "1", respectively, from the sub-pixel closest to the sub-pixel A to the farthest one from the sub-pixel A.

When neither sub-pixel B nor sub-pixel C corresponds to the skeleton portion of the character, the color element levels of the three sub-pixels adjacent to the left side of the sub-pixel A are determined according to the correction pattern 2 of the correction table 42*b*. This corresponds to the case illustrated in FIG. 33B. For example, when the correction table 60 (FIG. 6) is used as the correction table 42*b*, the correction pattern 2 is a pattern: "4", "2", "1". Therefore, the color element levels of the three sub-pixels adjacent to the left side of the sub-pixel A are set to "4", "2" and "1", respectively, from the sub-pixel closest to the sub-pixel A to the farthest one from the sub-pixel A.

Where more than one sub-pixels corresponding to the skeleton portion of the character are arranged along the horizontal direction, the leftmost one of those sub-pixels may be selected as the sub-pixel A.

Figure 34A:
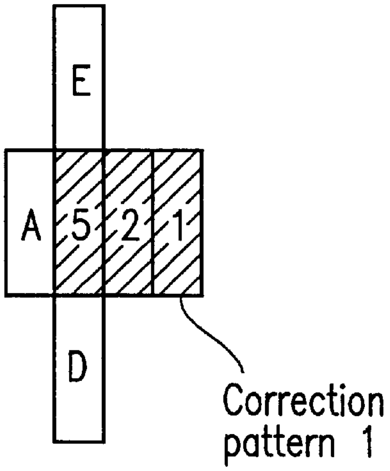
FIGS. 34A and 34B illustrate how to determine the color element level for sub-pixels arranged adjacent to the right side of a sub-pixel which corresponds to the skeleton portion of a character.
Figure 34B:
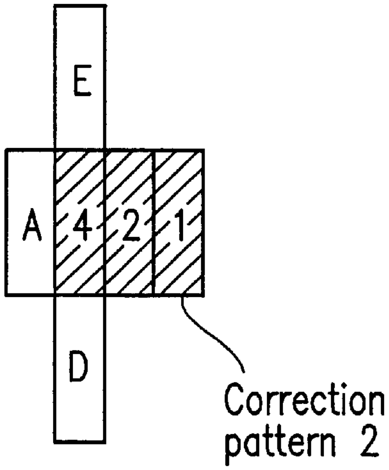

FIGS. 34A and 34B illustrate how to determine the color element level for sub-pixels arranged adjacent to the right side of a sub-pixel which corresponds to the skeleton portion of the character.

The color element levels of sub-pixels each arranged adjacent to the right side of a sub-pixel which corresponds to the skeleton portion of the character are determined in the downward direction, irrespective of the direction of the straight line between the start point and the end point of the stroke.

Referring to FIGS. 34A and 34B, the sub-pixel A corresponding to the skeleton portion of the character is assumed to be a reference sub-pixel, the sub-pixel located on the right lower side of the reference sub-pixel A is assumed to be a sub-pixel D, and the sub-pixel located on the right upper side of the reference sub-pixel A is assumed to be a sub-pixel E.

When at least one of the sub-pixel D and the sub-pixel E corresponds to the skeleton portion of the character, the color element level of the sub-pixel adjacent to the right side of the sub-pixel A is determined according to the correction pattern 1 of the correction table 42*b*. This corresponds to the case illustrated in FIG. 34A. For example, when the correction table 60 (FIG. 6) is used as the correction table 42*b*, the correction pattern 1 is a pattern: "5", "2", "1". Therefore, the color element levels of the three sub-pixels adjacent to the right side of the sub-pixel A are set to "5", "2" and "1", respectively, from the sub-pixel closest to the sub-pixel A to the farthest one from the sub-pixel A.

When neither sub-pixel D nor sub-pixel E corresponds to the skeleton portion of the character, the color element levels of the three sub-pixels adjacent to the right side of the sub-pixel A are determined according to the correction pattern 2 of the correction table 42*b*. This corresponds to the case illustrated in FIG. 34B. For example, when the correction table 60 (FIG. 6) is used as the correction table 42*b*, the correction pattern 2 is a pattern: "4", "2", "1". Therefore, the color element levels of the three sub-pixels adjacent to the right side of the sub-pixel A are set to "4", "2" and "1", respectively, from the sub-pixel closest to the sub-pixel A to the farthest one from the sub-pixel A.

Where more than one sub-pixels corresponding to the skeleton portion of the character are arranged along the horizontal direction, the rightmost one of those sub-pixels may be selected as the sub-pixel A.

Thus, the color element level of each sub-pixel adjacent to a sub-pixel corresponding to the skeleton portion of the character is determined. In FIGS. 33A, 33B, 34A and 34B, each number shown in a sub-pixel box indicates the color element level which is set for the sub-pixel.

In the above-described embodiments, the brightness of a sub-pixel is controlled according to the color element level (e.g., level 7 to level 0) associated therewith. Instead of controlling the brightness of a sub-pixel, it is alternatively possible to control one of the chroma, lightness, purity, and the like, associated with the color element. In such a case, instead of using the standard brightness table 90 illustrated in FIG. 9, respectively, the corresponding one of a chroma table indicating the relationship between the color element level and the chroma level of a sub-pixel, a lightness table indicating the relationship between the color element level and the lightness level of a sub-pixel, and a purity table indicating the relationship between the color element level and the purity level of a sub-pixel. It is also within the scope of the present invention to control a combination of two or more parameters (e.g., the brightness, chroma, lightness, purity) associated with each color element according to the color element level (e.g., level 7 to level 0) of the sub-pixel.

The display device 10 may be a stripe-type color liquid crystal display device. Alternatively, the display device 10 may be a delta-type color liquid crystal display device. Even with a delta-type color liquid crystal display device, effects similar to those provided by a stripe-type color liquid crystal display device can be obtained by independently controlling R, G, B sub-pixels which correspond to one pixel. The color liquid crystal display device may be a transmission type liquid crystal display device, which is widely used in personal computers, or the like, as well as a reflection type or rear projection type liquid crystal display device. However, the display device 10 is not limited to those color liquid crystal display devices. The display device 10 may be any color display apparatus including a plurality of pixels which are arranged along the X and Y directions (so-called "X-Y matrix display apparatus").

Moreover, the number of sub-pixels included in each sub-pixel 12 is not limited to three. The sub-pixel 12 may include any number (two or more) of sub-pixels arranged in a predetermined direction. For example, when N ($N \geqq 2$) color elements are used to represent a color, each sub-pixel 12 may include N sub-pixels.

The order of arrangement of the sub-pixels 14R, 14G and 14B is not limited to that illustrated in FIG. 4. For example, the sub-pixels may be arranged in the order of B, G, R along the X direction. Moreover, the direction of arrangement of the sub-pixels 14R, 14G and 14B is not limited to that illustrated in FIG. 4. The sub-pixels 14R, 14G and 14B may be arranged in any direction.

Furthermore, the group of color elements for use with the present invention is not limited to R (red), G (green), B (blue). Alternatively, the color elements may be C (cyan), Y (yellow), M (magenta).

According to the present invention, the relationship between the color element level of each sub-pixel and the brightness level of the sub-pixel is changed according to at least one of character color information and background color information. Therefore, characters can be displayed with a high definition by controlling the brightness of a display device on a sub-pixel by sub-pixel basis while a color is added to the characters or to a background of the characters.

Further, a color can be added to a character while a skeleton portion (i.e., core structure) of the character, which represents core lines of strokes of the character, is kept black. Therefore, the color contrast between adjacent characters can be suppressed. As a result, characters which are not harsh and easy to read can be displayed so that the characters do not tire an eye of the viewer.

Furthermore, a certain area of a displayed sentence can be emphasized by changing a background color of a character. Moreover, by replacing a color of a character and a background color of the character, a brighter character can be displayed so that the character can be easily viewed.

Still further, by changing the relationship between the color element level of a sub-pixel and the brightness level of the sub-pixel along with the passage of time, a color of a character or a background color of a character can be changed along with the passage of time, whereby the character can be emphasized. Such an emphasizing method prevents a character from vanishing as would occur when a character is emphasized by blinking. Thus, it is possible to provide a pleasant display which is easy for a human eye to observe.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A character display apparatus, comprising:

a display device having a plurality of pixels; and a control section for controlling the display device, wherein:

each of the pixels includes a plurality of sub-pixels arranged along a predetermined direction;

a corresponding one of a plurality of color elements is pre-assigned to each of the sub-pixels;

an intensity of each of the color elements is represented stepwise through a plurality of color element levels;

the control section executes tasks of:

setting one of the color element levels for each of the sub-pixels;

according to a relationship between the plurality of color element levels and a plurality of brightness levels, converting the color element level set for each of the sub-pixels to a corresponding brightness level among the plurality of brightness levels; and changing the relationship according to at least one of character color information which defines a color of a character to be displayed on the display device and background color information which defines a background color of the character.

2. A character display apparatus according to claim 1, wherein:

the character color information includes information representing a color type of the character; and the control section changes the relationship according to the information representing a color type of the character.

3. A character display apparatus according to claim 2, wherein:

the character color information further includes information representing a color darkness of the character; and the control section changes the relationship according to the information representing a color type of the character and the information representing a color darkness of the character.

4. A character display apparatus according to claim 1, wherein:

the character color information includes information representing a background color type of the character; and the control section changes the relationship according to the information representing a background color type of the character.

5. A character display apparatus according to claim 4, wherein:

the character color information further includes information representing a background color darkness of the character; and the control section changes the relationship according to the information representing a background color type of the character and the information representing a background color darkness of the character.

6. A character display apparatus according to claim 1, wherein:

the relationship is determined based on one or more parameters; and at least one of the one or more parameters is a function of time.

7. A character display apparatus according to claim 1, wherein the control section changes the relationship according to character reverse information which determines whether or not the color type of the character and the background color type of the character are replaced with each other.

8. A character display method for displaying a character on a display device having a plurality of pixels, wherein:

each of the pixels includes a plurality of sub-pixels arranged along a predetermined direction;

a corresponding one of a plurality of color elements is pre-assigned to each of the sub-pixels;

an intensity of each of the color elements is represented stepwise through a plurality of color element levels;

the character display method includes steps of:

setting one of the color element levels for each of the sub-pixels;

according to a relationship between the plurality of color element levels and a plurality of brightness levels, converting the color element level set for each of the sub-pixels to a corresponding brightness level among the plurality of brightness levels; and changing the relationship according to at least one of character color information which defines a color of a character to be displayed on the display device and background color information which defines a background color of the character.

9. A recording medium which can be read by an information display apparatus, the apparatus comprising a display device having a plurality of pixels and a control section for controlling the display device, wherein:

each of the pixels includes a plurality of sub-pixels arranged along a predetermined direction;

a corresponding one of a plurality of color elements is pre-assigned to each of the sub-pixels;

an intensity of each of the color elements is represented stepwise through a plurality of color element levels;

the recording medium includes a program which causes the control section to execute steps of:

setting one of the color element levels for each of the sub-pixels;

according to a relationship between the plurality of color element levels and a plurality of brightness levels, converting the color element level set for each of the sub-pixels to a corresponding brightness level among the plurality of brightness levels; and changing the relationship according to at least one of character color information which defines a color of a character to be displayed on the display device and background color information which defines a background color of the character.

* * * * *